United States Patent
Bansal et al.

(10) Patent No.: US 11,258,681 B2
(45) Date of Patent: Feb. 22, 2022

(54) APPLICATION ASSESSMENT AND VISIBILITY FOR MICRO-SEGMENTATION OF A NETWORK DEPLOYMENT

(71) Applicant: Nicira, Inc., Palo Alto, CA (US)

(72) Inventors: Kaushal Bansal, Pleasanton, CA (US); Uday Masurekar, Sunnyvale, CA (US); Srinivas Nimmagadda, San Jose, CA (US); Jingmin Zhou, San Jose, CA (US); Abhishek Goliya, Pune (IN); Amit Chopra, Palo Alto, CA (US); Kausum Kumar, Los Gatos, CA (US)

(73) Assignee: NICIRA, INC., Palo Alto, CA (US)

( * ) Notice: Subject to any disclaimer, the term of this patent is extended or adjusted under 35 U.S.C. 154(b) by 140 days.

(21) Appl. No.: 15/713,702

(22) Filed: Sep. 25, 2017

(65) Prior Publication Data

US 2018/0176102 A1 Jun. 21, 2018

(30) Foreign Application Priority Data

Dec. 16, 2016 (IN) .............................. 201641043058

(51) Int. Cl.
| | | |
|---|---|---|
| *H04L 12/26* | (2006.01) | |
| *H04L 29/08* | (2006.01) | |
| *G06F 9/455* | (2018.01) | |
| *H04L 29/06* | (2006.01) | |
| *H04L 43/026* | (2022.01) | |
| *H04L 67/14* | (2022.01) | |
| *H04L 67/51* | (2022.01) | |
| *H04L 43/045* | (2022.01) | |
| *H04L 43/18* | (2022.01) | |

(52) U.S. Cl.
CPC ........ *H04L 43/026* (2013.01); *G06F 9/45558* (2013.01); *H04L 43/045* (2013.01); *H04L 63/0263* (2013.01); *H04L 67/14* (2013.01); *H04L 67/16* (2013.01); *G06F 2009/45595* (2013.01); *H04L 43/18* (2013.01); *H04L 63/0236* (2013.01); *H04L 63/0254* (2013.01)

(58) Field of Classification Search
CPC ....... G06F 2009/45595; H04L 63/0254; H04L 43/045
USPC ....................................... 709/224
See application file for complete search history.

(56) References Cited

U.S. PATENT DOCUMENTS

| | | |
|---|---|---|
| 7,849,502 B1 | 12/2010 | Bloch et al. |
| 8,605,655 B1 | 12/2013 | Sahai et al. |
| 9,215,213 B2 | 12/2015 | Bansal et al. |
| 9,438,560 B2 | 9/2016 | Mohanty et al. |

(Continued)

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

(Continued)

*Primary Examiner* — Backhean Tiv
*Assistant Examiner* — Jonathan A Sparks
(74) *Attorney, Agent, or Firm* — Adeli LLP

(57) ABSTRACT

A method for visualizing network flows of a network is provided. The method monitors network flows between a group of machines in a network. The method associates identifiers with the monitored network flows. The method aggregates the monitored network flows into a set of groups based on the associated identifiers. The method displays a set of flow records for the each group of the set of groups.

18 Claims, 29 Drawing Sheets

(56) References Cited

U.S. PATENT DOCUMENTS

| | | |
|---|---|---|
| 9,438,634 B1 | 9/2016 | Ross et al. |
| 9,467,476 B1 | 10/2016 | Shieh et al. |
| 9,787,641 B2 | 10/2017 | Bansal et al. |
| 10,298,619 B2 | 5/2019 | Nimmagadda et al. |
| 10,419,321 B2 | 9/2019 | Raman et al. |
| 10,567,440 B2 | 2/2020 | Bansal et al. |
| 10,608,993 B2 | 3/2020 | Bansal et al. |
| 10,728,121 B1 | 7/2020 | Chitalia et al. |
| 10,742,673 B2 | 8/2020 | Tiagi et al. |
| 11,018,970 B2 | 5/2021 | Raman et al. |
| 2003/0120955 A1 | 6/2003 | Bartal et al. |
| 2005/0198247 A1 | 9/2005 | Perry et al. |
| 2005/0262554 A1 | 11/2005 | Brooks et al. |
| 2007/0011734 A1 | 1/2007 | Balakrishnan et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0267186 A1 | 10/2008 | Boukis et al. |
| 2008/0282335 A1 | 11/2008 | Abzarian et al. |
| 2009/0279547 A1 | 11/2009 | Mistry et al. |
| 2009/0300341 A1 | 12/2009 | Buehler et al. |
| 2010/0106764 A1 | 4/2010 | Chadwick et al. |
| 2010/0107085 A1 | 4/2010 | Chadwick et al. |
| 2010/0293544 A1 | 11/2010 | Wilson et al. |
| 2010/0325199 A1 | 12/2010 | Park et al. |
| 2010/0332262 A1 | 12/2010 | Horvitz et al. |
| 2011/0208824 A1 | 8/2011 | Lidström et al. |
| 2012/0011284 A1 | 1/2012 | Filali-Adib et al. |
| 2012/0131591 A1 | 5/2012 | Moorthi et al. |
| 2012/0151408 A1 | 6/2012 | Groth et al. |
| 2012/0226808 A1 | 9/2012 | Morgan |
| 2012/0317566 A1 | 12/2012 | Santos et al. |
| 2013/0031037 A1* | 1/2013 | Brandt .................... G06N 20/00 706/12 |
| 2013/0067090 A1 | 3/2013 | Batrouni et al. |
| 2013/0159865 A1 | 6/2013 | Smith et al. |
| 2013/0185413 A1 | 7/2013 | Beaty et al. |
| 2014/0245423 A1* | 8/2014 | Lee ..................... H04L 63/0218 726/12 |
| 2014/0373091 A1 | 12/2014 | Kimer et al. |
| 2015/0019569 A1 | 1/2015 | Parker et al. |
| 2015/0135003 A1 | 5/2015 | Cota-Robles et al. |
| 2015/0236935 A1 | 8/2015 | Bassett |
| 2015/0269383 A1* | 9/2015 | Lang ....................... H04L 63/20 726/1 |
| 2015/0358288 A1 | 12/2015 | Jain et al. |
| 2015/0358391 A1* | 12/2015 | Moon ..................... H04L 67/10 709/224 |
| 2016/0110211 A1 | 4/2016 | Kames |
| 2016/0112443 A1 | 4/2016 | Grossman et al. |
| 2016/0156591 A1 | 6/2016 | Zhou et al. |
| 2016/0191463 A1 | 6/2016 | Mohanty et al. |
| 2016/0205002 A1* | 7/2016 | Rieke ..................... H04L 41/142 709/224 |
| 2016/0294987 A1 | 10/2016 | Tian et al. |
| 2016/0323318 A1* | 11/2016 | Terrill ................. H04L 63/0227 |
| 2016/0350683 A1 | 12/2016 | Bester et al. |
| 2016/0380848 A1 | 12/2016 | Raney |
| 2017/0005986 A1 | 1/2017 | Bansal et al. |
| 2017/0019487 A1 | 1/2017 | Maheshwari et al. |
| 2017/0078168 A1 | 3/2017 | Harris et al. |
| 2017/0118102 A1 | 4/2017 | Majumder et al. |
| 2017/0126727 A1* | 5/2017 | Beam ................. H04L 63/1433 |
| 2017/0171159 A1 | 6/2017 | Kumar et al. |
| 2017/0207968 A1 | 7/2017 | Eicken et al. |
| 2017/0222977 A1* | 8/2017 | Newell ............. H04W 12/0802 |
| 2017/0293994 A1 | 10/2017 | Li et al. |
| 2017/0324632 A1 | 11/2017 | Arora |
| 2017/0324765 A1* | 11/2017 | McLaughlin ....... H04L 63/1441 |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0077119 A1 | 3/2018 | Fields et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0115586 A1 | 4/2018 | Chou et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176252 A1 | 6/2018 | Nimmagadda et al. |
| 2018/0176261 A1 | 6/2018 | Bansal et al. |
| 2018/0295148 A1 | 10/2018 | Mayorgo |
| 2018/0329958 A1 | 11/2018 | Choudhury et al. |
| 2019/0180141 A1 | 6/2019 | Tiagi et al. |
| 2019/0182276 A1 | 6/2019 | Tiagi et al. |
| 2019/0230064 A1 | 7/2019 | Soman |
| 2021/0194849 A1 | 6/2021 | Parashar et al. |
| 2021/0194931 A1 | 6/2021 | Parashar et al. |

OTHER PUBLICATIONS

Blei, David M., "Probabilistic Topic Models," Communications of the ACM, Apr. 2012, 8 pages, vol. 55, No. 4, ACM, New York, New York, USA.

Mimno, David, et al., "Bayesian Checking for Topic Models," Proceedings of the Conference on Empirical Methods in Natural Language Processing, Jul. 27-31, 2011, 11 pages, ACL, Edinburgh, Scotland, UK.

Steyvers, Mark, et al., "Probabilistic Topic Models," Handbook of Latent Semantic Analysis, Month Unknown 2007, 15 pages, Laurence Erlbaum Associates.

Anwar, Mahwish, "Virtual Firewalling for Migrating Virtual Machines in Cloud Computing," 2013 5th International Conference on Information and Communication Technologies, Dec. 14-15, 2013, 11 pages, IEEE, Karachi, Pakistan.

Maheshwari, Ritu, et al., "Private Virtual Cloud Infrastructure Modelling using 'VCPHCF-RTT' Security Agent," 2018 4th International Conference on Computing Communication and Automation (ICCCA), Dec. 14-15, 2018, 5 pages, IEEE, Greater Noida, India.

Ghafir, Ibrahim, et al., "A Survey on Network Security Monitoring Systems," 2016 IEEE 4th International Conference on Future Internet of Things and Cloud Workshops, Aug. 22-24, 2016, 6 pages, IEEE, Vienna, Austria.

Lee, Hanseung, et al., "IVisClustering: An Interactive Visual Document Clustering via Topic Modeling," EuroVis12: Eurographics Conference on Visualization, vol. 31, No. 3, Jun. 2012, 10 pages, The Eurographics Association and Blackwell Publishing Ltd., Oxford, UK, and MA, USA.

Niu, Xiangyu, et al., "Network Steganography based on Traffic Behavior in Dynamically Changing Wireless Sensor Networks," 2015 IEEE International Conference on Communications, Jun. 8-12, 2015, 6 pages, IEEE, London, UK.

\* cited by examiner

APPLICATION ASSESSMENT AND VISIBILITY FOR MICRO-SEGMENTATION OF A NETWORK DEPLOYMENT

CLAIM OF BENEFIT TO PRIOR APPLICATIONS

This application claims the benefit of Indian Patent Application No. 201641043058, titled "Application Assessment and Visibility for Micro-Segmentation of a Network Deployment" and filed on Dec. 16, 2016. Indian Patent Application No. 201641043058 is incorporated herein by reference.

BACKGROUND

Datacenters or cloud environments have traditionally been secured by emphasizing perimeter protection to keep outside threats from affecting the entities within the network. Security services such as firewall were provided at the perimeter to monitor the north-south traffic (i.e., the traffic exchanged with the outside environment) and detect the outside threats.

In a multi-tenant environment, different host machines host virtual machines (VMs) for different users (or tenants). In some cases, several logically separated workloads (or guest) VMs of different tenants operate on a single host. In such shared environments, security services (as well as other services) must be applied within the datacenter, not only against external threats, but also from threats of other machines within the datacenter or other VMs running on the same host. In some such cases, the services are distributed and enforced throughout the network. For example, a distributed firewall provides firewall services with multiple enforcement points throughout the network to enable security for the east-west traffic (i.e., the traffic within the multi-tenant environment).

Micro-segmentation divides a physical network into logical sub-networks to prevent communication across unrelated entities, to establish security around individual or groups of related workloads, and to provide distributed services such as a distributed firewall that are tailored to each individual tenant's requirements. Micro-segmentation provides new capabilities for the tenants of a datacenter to protect granular intra-application communications. Deploying micro-segmentation with appropriate policies, however, is turning out to be a challenging proposition. This is applicable both to the initial (or greenfield) onboarding process of enabling micro-segmentation in a tenant environment as well as in brown-field scenarios where the applications are already deployed in the datacenter before network micro-segmentation is put in place.

The factors that contribute to this challenge include, but not limited to, the followings. In multi-tiered application scenarios, security teams are only aware of the traffic to be allowed for the initial tier of the application (e.g., Human Resources server on IP 192.168.20.10 needs to have port 80 opened). Since most enterprise applications are not documented in terms of the intra-application communications, the security teams are not aware of all components that constitute the application, and more importantly the internal communications that actually happens across the application components. In addition, the application developers that built an original application may have moved on, making authoritative application behavior determination a challenging task.

In traditional approaches to securing datacenters that focused on having perimeter based controls like firewalls, the security administrators needed to know only the ports that have to be opened to allow access to an application. Most often this is the web server to which port 80 (i.e., hypertext transfer protocol (HTTP) port) traffic has to be permitted in the firewalls. Other than this port that needs to be opened, the firewall administrators are not typically aware of all intra-application communications that need to be permitted for the application to work as intended. As a result, the administrators end up not having sufficient control for the intra-application communications.

Although micro-segmentation as a technology enables firewall administrators to build very granular access control rules for intra-application components, it is often a challenge for the firewall administrators to understand all different communications that need to be enabled between these components to make sure an application actually works as expected. The excitement around achieving granular micro-segmentation inside the datacenter turns quickly into a multi-month endeavor identifying the application behaviors.

BRIEF SUMMARY

Some embodiments utilize a multistep flow monitoring and analysis method to provide application visibility and identify policies in a micro-segmentation environment. The multistep method in some embodiments includes a monitoring, or flow collection, stage. A set of VMs that constitute an application are identified and used as a seed. During a monitoring period, packet flows are monitored for the seed VMs. The identified packet flows are then analyzed to identify individual applications (e.g., web or database applications), types of protocols (e.g., HTTP, dynamic host configuration protocol (DHCP), etc.), and the direction of the flows (i.e., in, out, and intra directions).

The flows are then reduced by morphing a large number of flows into smaller groups of related flows. Firewall rules for the smaller groups of flows are then created either automatically or through user interactions. The rules are then presented for review (e.g., by getting approval from a security administrator). The rules are then enforced by publishing the rules into the current firewall rule table.

Some embodiments provide a method that is used in an environment that hosts a set of applications (e.g., three tiered enterprise applications) and generates a network topology without having access to an object inventory of network virtualization manager server that is used to define different network entities. The method, without an actual knowledge of the network topology, monitors communication flows and creates a network connectivity graph. The method creates a flow graph by collecting flow information from virtualization software (e.g., hypervisors) on the hosts. The method then creates security suggestions (such as creation of security groups), which can be used in firewall rules. The method then creates firewall rules by using the security groups.

Some embodiments identify unique network traffic by performing deep packet inspection (DPI). Based on pattern matching done during the DPI, an application template is defined that is used for policy creation. Micro-segmentation policy is customized based on the template to match the existing (i.e., brownfield) deployments as well as new (i.e., greenfield) deployments.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 8 illustrates an example a portion of a GUI in some embodiments while the monitoring stage is in progress.

FIG. 17 illustrates an example of a GUI in some embodiments showing rule details that are provided for a particular flow.

FIG. 20 illustrates an example of a GUI in some embodiments that displays a consolidated view of several flows.

FIG. 21 illustrates an example of a GUI in some embodiments that displays an expanded view showing all raw flows that are consolidated into a single flow.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method of defining micro-segmentation or security policies using a zero trust model for new and existing applications in a datacenter. In a zero trust model, a network is divided into small (or micro) segments and security is applied at the boundaries of each micro-segment. The method analyzes packet traffic generated by the virtual machines that implement these applications. The method receives a selection of a set of seed nodes (for instance through a user interface) and performs flow collection, flow analysis and security policies definition for the seeds in parallel.

Figure 1:
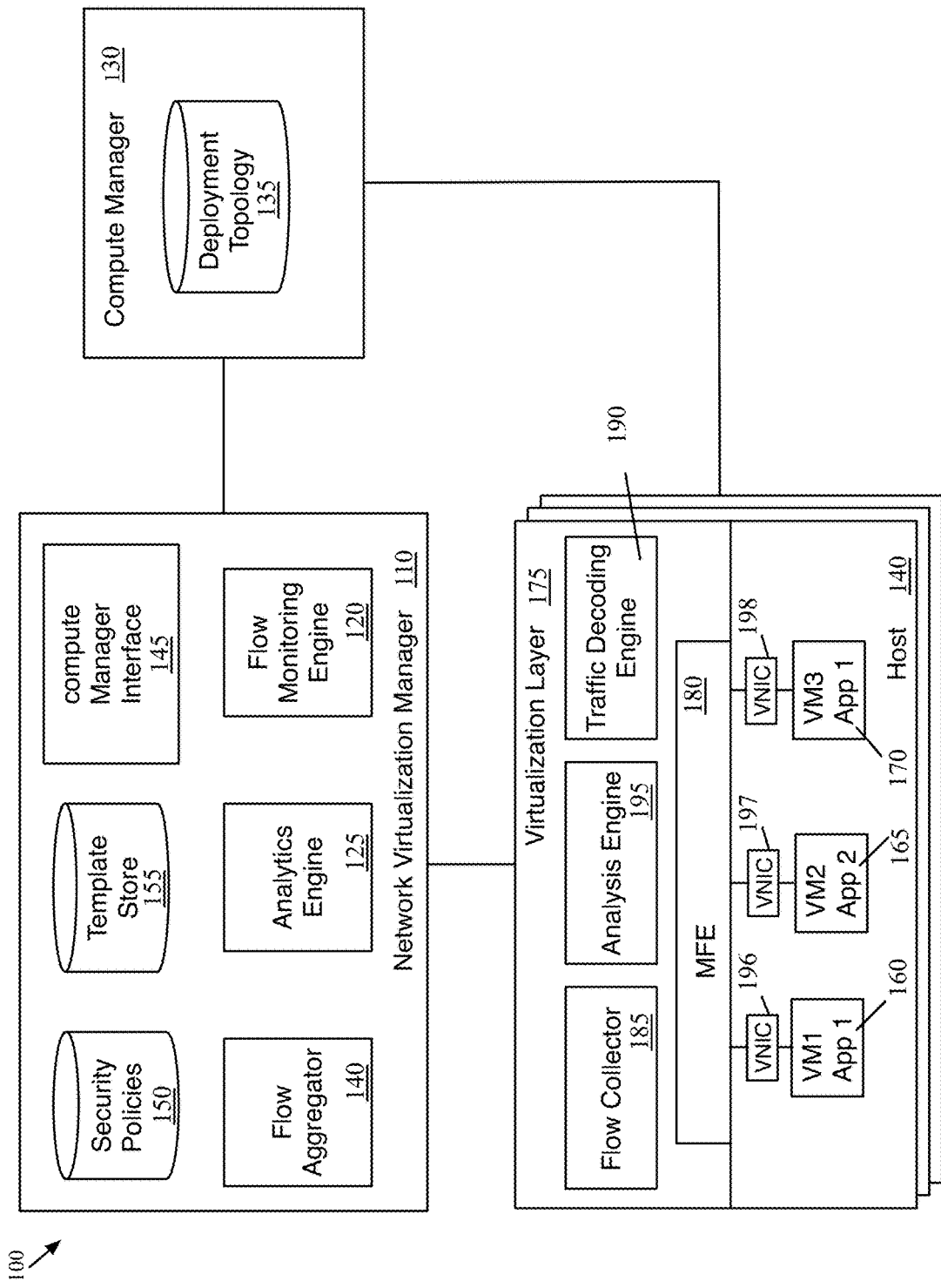
FIG. 1 conceptually illustrates a system for providing application visibility and identifying policies in a micro-segmentation environment in some embodiments.

Some embodiments perform flow monitoring and analysis to provide application visibility and identify policies in a micro-segmentation environment. FIG. 1 conceptually illustrates a system 100 for providing application visibility and identifying policies in a micro-segmentation environment in some embodiments. As shown, the system includes a network virtualization manager 110, a compute manager 130, and several hosts 140 (e.g., physical host machines for hosting a set of VMs).

The network virtualization manager 110 in some embodiments is a virtualized server that is installed on one or more physical servers and is used to define and/or manage the networking resources of a datacenter. As shown, the network virtualization manager includes a flow monitoring engine 120, an analytics engine 125, a flow aggregator 140, and an interface 145 to communicate with the compute manager 130. The network virtualization manager also includes storage 150 to store micro-segmentation security policies. The network virtualization manager also includes storage 155 for storing application templates that are built and used for generating micro-segmentation security policies.

The compute manager 130 in some embodiments is a virtualized server that is installed on one or more physical servers. The compute manager is used to manage compute infrastructure (e.g., the hosts and VMs) of a datacenter. As shown, the compute manager includes storage 135 to store the system deployment topology. For instance, the deployment topology indicates which VM is hosted on each host 140. The deployment topology in some embodiments also indicates the components of which applications are running by each VM 160-170. For instance, both VMs 160 and 170 may run components of the same application where VM 160 may run a web server and VM 170 may run an application server for the same 3-tiered enterprise application. Network virtualization manager 110 communicates with compute manager 130 through an interface 145 such as a plug-in and/or an application programming interface (API) in order to query the compute manager for the system deployment topology 135.

Each host 140 in some embodiments may include a virtualization layer 175 that includes virtualization software (e.g., a hypervisor) for virtualizing physical resources of the host machine. Each host may also include a host managed forwarding element (MFE) 180 for forwarding network traffic (e.g., data messages) to and from the virtual machines. In some embodiments, the host MFE 180 is configured to logically forward data messages according to logical forwarding elements (e.g., logical switches, logical routers) configured by an administrator of the network to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the MVs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, several MFEs distributed throughout the network implement tenant's LFEs, where each MFE is a local instantiation of an LFE that operate across different host machines and can perform Open Systems Interconnection (OSI) model Layer 2 (L2)/Layer 3 (L3) packet forwarding between VMs on the host machine or on different host machines. An LFE is sometimes referred to as a virtual distributed switch (VDS).

Each host also includes a traffic decoding engine 190, an analysis engine 195, and a flow collector 185. Traffic decoding engine, analysis engine, and flow collector in some embodiments are either a part of the MFE or are part of one or more entities such as a plugin or a filter that operates in conjunction with the MFE. Traffic decoding engine 190 decodes packet traffic, analysis engine 195 perform analysis such as deep packet inspection (DPI) on the packets, and flow collector 185 collects network packet flow information. Example of network packet flow information includes the following set of tuples: source Internet protocol (IP) address, destination IP address, source port identification, destination port identification, and protocol type. In some embodiment, such a set of tuples uniquely identifies each network packet flow.

The flow collector also collects additional information such as statistics (e.g., packet count) as well as the direction of each packet flow. In some embodiments, each VM 160-170 is connected to the MFE 180 through a virtual network interface card (VNIC) 196-198. The flow collector in some embodiments collects information for flows that enter or leave each VNIC. The direction of a flow (e.g., in or out) indicates whether the flow was entering or leaving the VNIC. The network virtualization manager 110 utilizes the collected flow information to analyze the flows and provide micro=segmentation policies (e.g., rules for a firewall that is distributed among the hosts and enforces firewall rules at several different enforcement points with the network (e.g., at the VNICs 196-198).

Several more detailed embodiments are described below. Specifically, Section I describes providing micro-segmentation policies for network traffic flows. Section II describes visualizing packet flows of a network in some embodiments. Section III then describes creating and using application templates for providing micro-segmentation policies in some embodiments. Finally, section IV describes an electronic system with which some embodiments of the invention are implemented.

I. Providing Micro-Segmentation Policies for Network Traffic Flows

Figure 2:
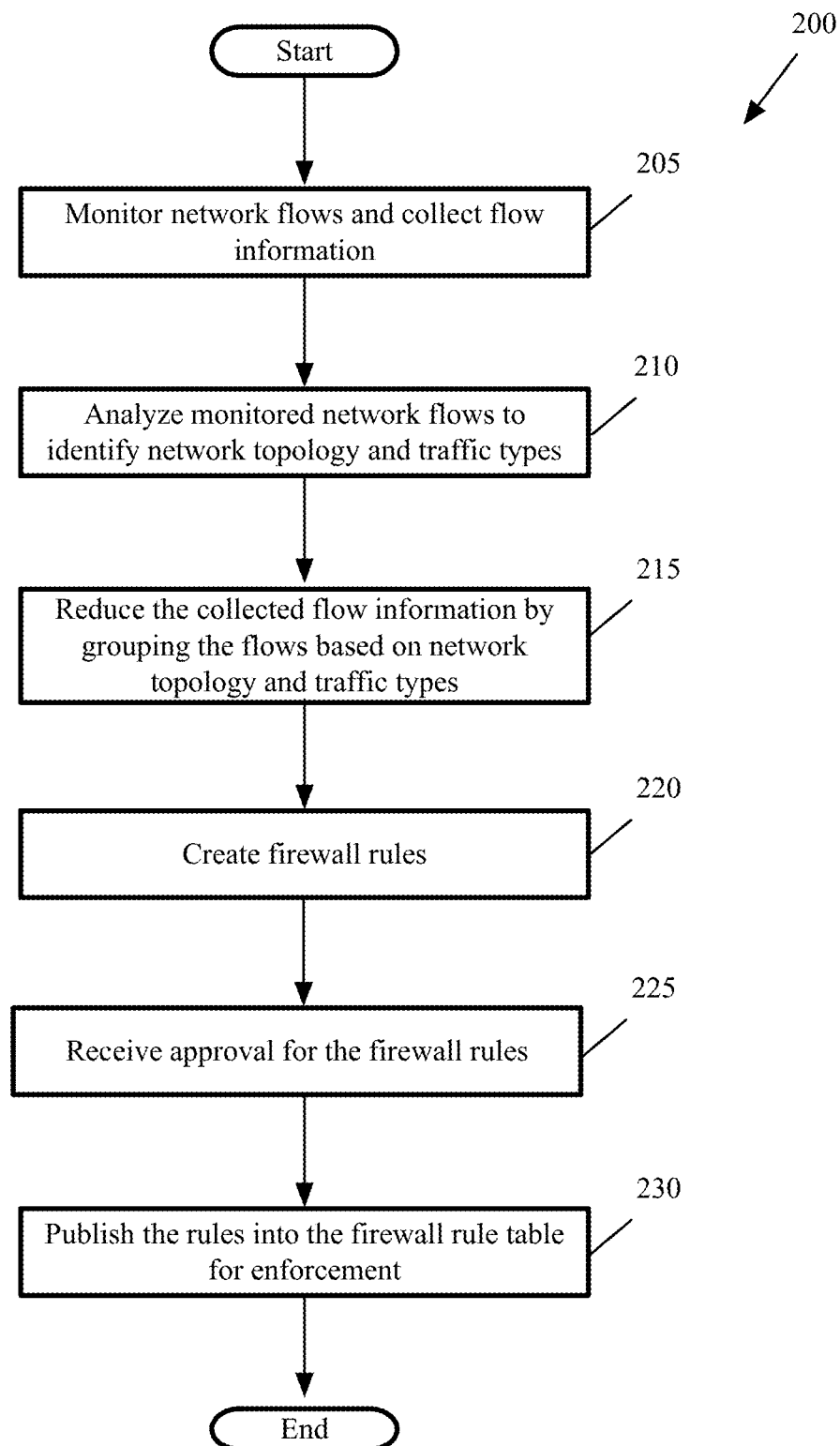
FIG. 2 conceptually illustrates a process for performing flow monitoring and analysis in some embodiments.

Some embodiments utilize a multi-stage flow monitoring and analysis method to identify security policies in a micro-segmentation environment. FIG. 2 conceptually illustrates a process 200 for performing flow monitoring and analysis in some embodiments. The process in some embodiments is performed by a network virtualization manager such as network virtualization manager 100 in FIG. 1.

As shown, process 200 monitors (at 205) the network traffic flows and collects flow information for a set of VMs that constitute an application. During a monitoring period, packet flows are monitored for the set of VMs and information such as an n-tuple information for source IP address, destination IP address, source port identification, destination port identification, and protocol type are collects from the header of packets in each packet flow. Other information such as packet count and directions of each flow is also collected and stored. The process then analyzes (at 210) the packet flows to identify individual applications, types of protocols, and to further refine the direction of the flows in order to determine network topology and traffic types.

The process then reduces (at 215) the collected flow information by aggregating flows into groups of related flows. The process then creates (at 220) micro-segmentation policies such as distributed firewall rules for each group of flows. The policies are generated either automatically or through user interactions. The process then receives (at 225) approval for the firewall rules by presenting the rules on a graphical user interface (GUI) for review and approval by a security administrator. The process then publishes (at 230) the rules into the current firewall rule table for enforcement in order to be sent to enforcement points. The process then ends. Further details of each operation of process 200 are described below.

A. Monitoring Stage

For the monitoring (or packet flow collection) stage, the VMs which constitute different applications (e.g., applications for which firewall rules need to be written) are identified. These VMs are referred herein as "seed" VMs. Seed VMs for each application includes the set of the VMs which constitute the application and for which the flow collection process is performed.

Figure 3:
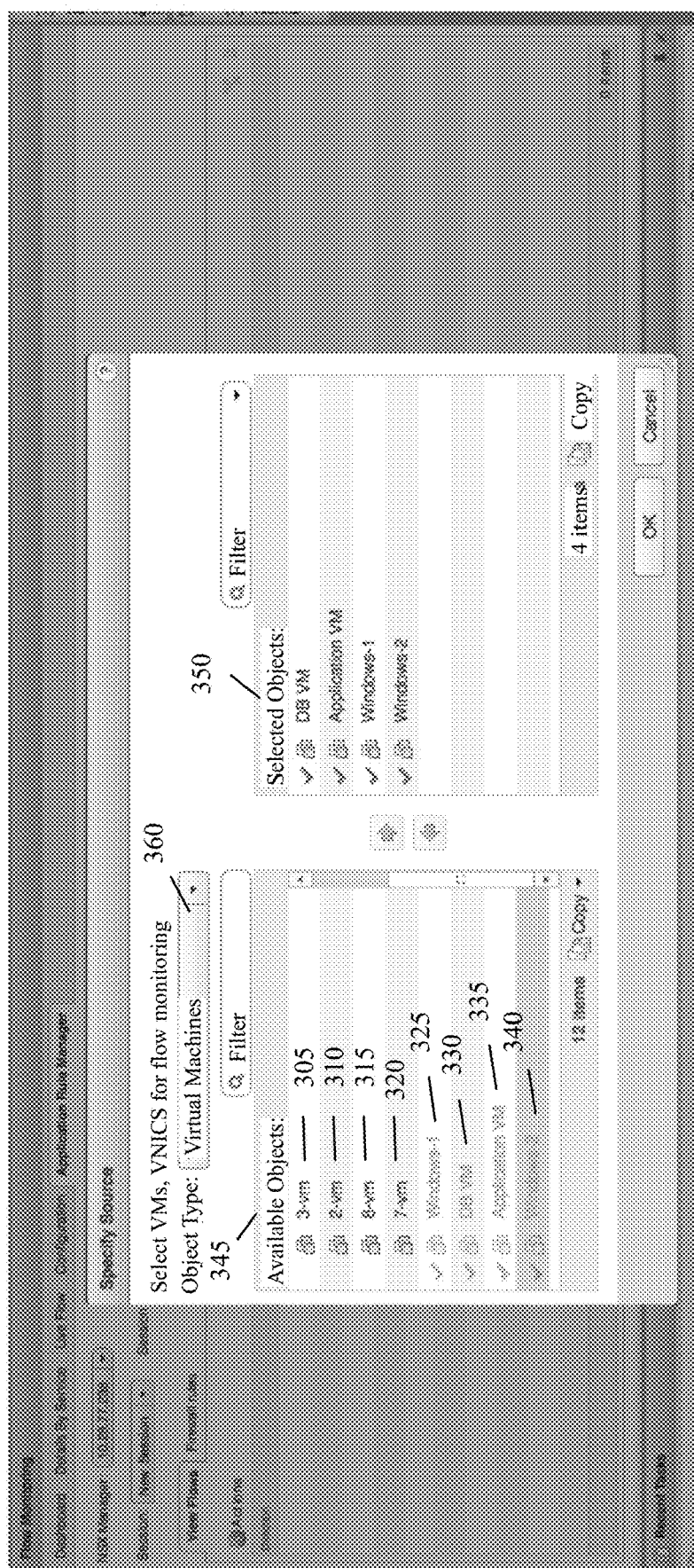
FIG. 3 illustrates an example of a graphical user interface (GUI) after several VMs and services are identified as seeds for different applications in some embodiments.

FIG. 3 illustrates an example of a GUI after several VMs and services are identified as seeds for different applications in some embodiments. As shown, the GUI provides a selection tool 360 for selecting lists of different objects such as VMs or VNICs for display.

In this example, the list 345 of available VMs are displayed. As shown, there are several VMs 305-340 listed as available objects. These VMs can be tenant (or workload) VMs as well as service VMs. The GUI also shows that 4 VMs 325-340 are selected for monitoring and are displayed as selected objects 350.

Figure 4:
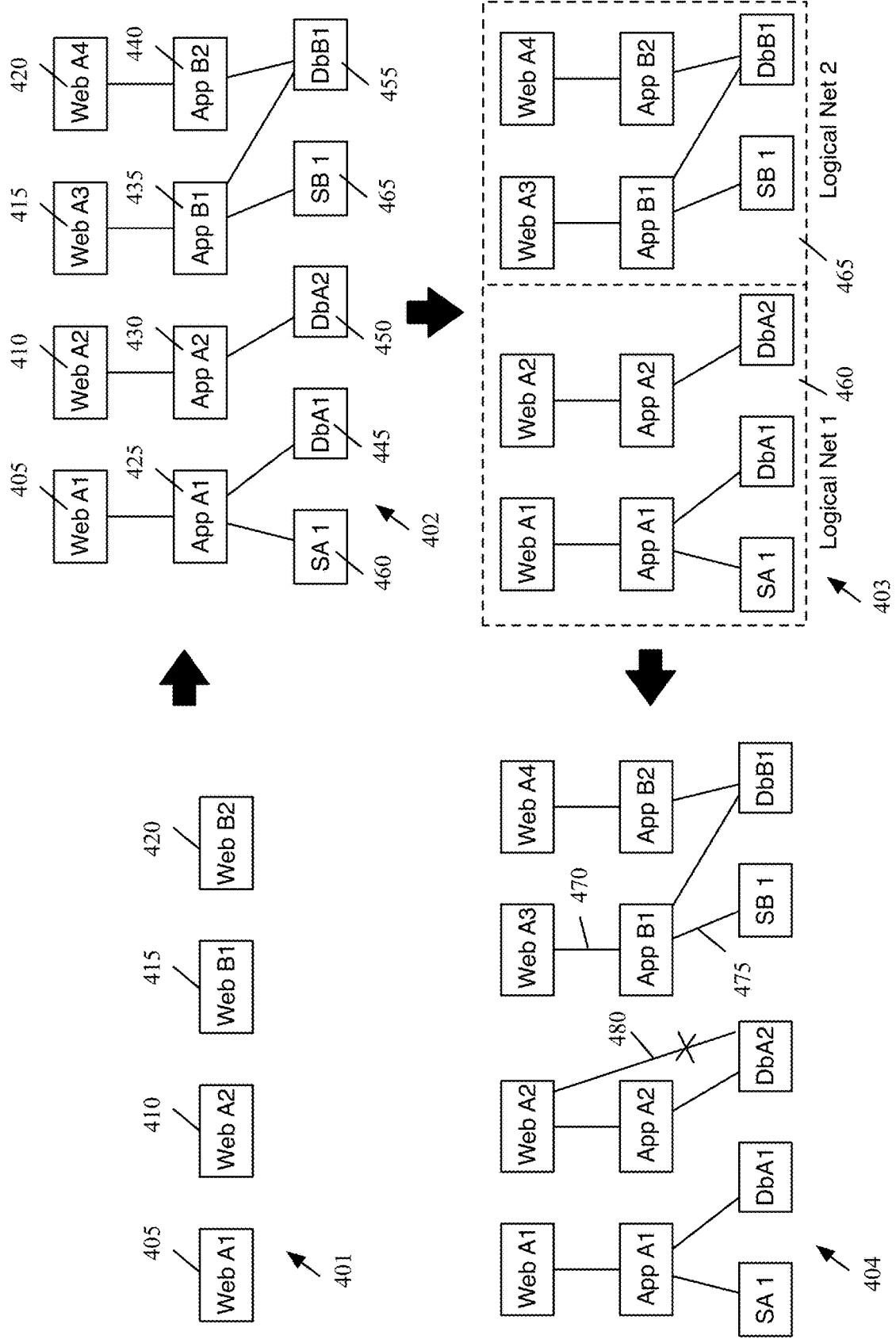
FIG. 4 conceptually illustrates a set of VMs that are selected as the seed in some embodiments.

FIG. 4 conceptually illustrates a set of VMs that are selected as the seed in some embodiments. The figure is shown in four stages 401-404. In stage 401, several VMs 405-420 are selected as the seed for different applications. In this example, VMs 405 and 410 are web servers of two applications (applications A1 and A2) of a particular tenant (tenant A). VMs 415 and 420 are web servers of two applications (applications B1 and B2) of another tenant (tenant B).

The seed in some embodiments can be expanded and shrunken during the monitoring stage. This allows an administrator to identify the application in a better way by monitoring the flow and identifying different components of the application. For instance, the monitoring stage in FIG. 4 initially included VMs that are used as web servers as the seed for each application. As shown in stage 402, application server VMs 425-440, database server VMs 445-455, and service VMs 460-465 such as load balancers etc., are included in the seed during the monitoring stage. Similarly, after monitoring the flows for a period of time, certain VMs may be removed from an application's seed. Flow collection in some embodiments can happen in the background and can be stopped and restarted if needed for a given session.

In order to allow traffic flow to the seed VMs, a firewall rule of "any to any, allow" is applied to the seed VMs. For instance, a firewall section in the distributed firewall (DFW) rule configuration is created and the rule "any to any, allow" is placed on top of the section. The firewall section is then applied to the seed VMs. This ensures that all traffic to/from the seed VMs is allowed and collected by a flow monitoring component (e.g., flow monitoring engine 120 in FIG. 1) at the virtualization software.

Figure 5:
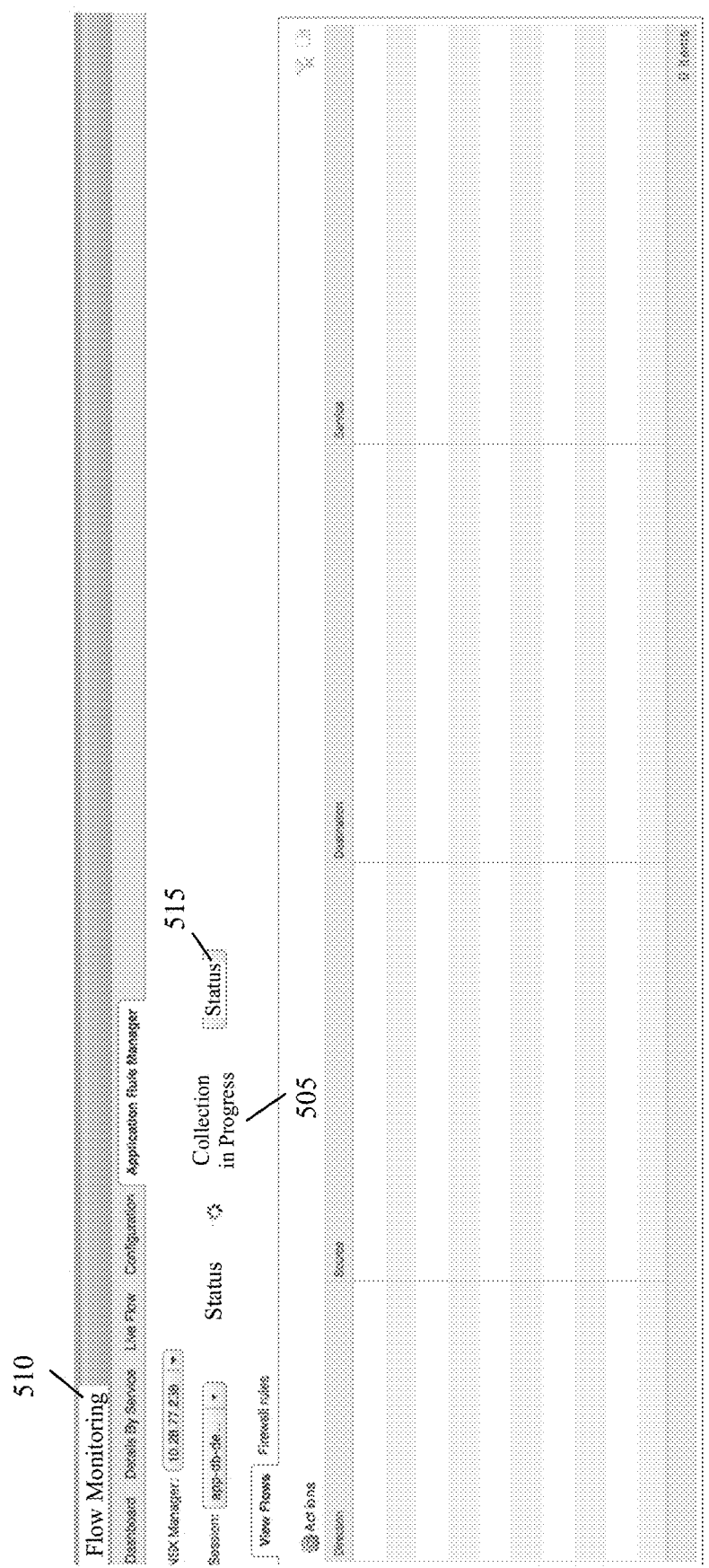
FIG. 5 illustrates an example of a GUI after flow collection has stated in some embodiments.

Once the rules are enforced in the system, the flow collection is enabled for the seed VMs. FIG. 5 illustrates an example of a GUI after flow collection has stated in some embodiments. The GUI shows (as indicated by 505) that flow collection is in progress during the flow monitoring stage (as indicated by 510). The GUI also provides a control 515 to manually stop the monitoring process.

Figure 6:
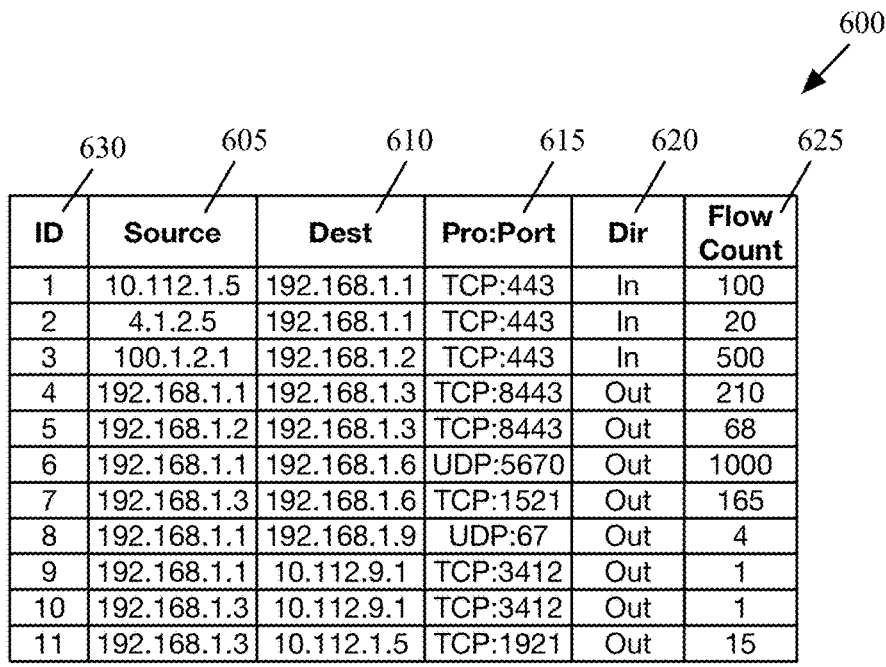
FIG. 6 conceptually illustrates an example of the data collected during a monitoring session in some embodiments.

The network virtualization manager keeps polling the virtualization software of the hosts where the seed VMs are hosted and stores the data. FIG. 6 conceptually illustrates an example of data collected during a monitoring session in some embodiments. As shown, the collected data 600 includes source IP address 605 of the flows, destination IP address 610 of the flows, the protocol and port number 615, the direction of the flows 620, and the number of packets 625 in each flow. The flow collection in some embodiments happens at the VNIC level (e.g., VNICs 196-198 in FIG. 1). The direction of the flow is, therefore, either "in" or "out" based on whether the flow is originating from the VNIC or coming to the VNIC. In order to compare the entries in table 600 with the entries in table 700 described below by reference to FIG. 7, each flow in these tables is conceptually assigned an identifier 630.

Figure 8:
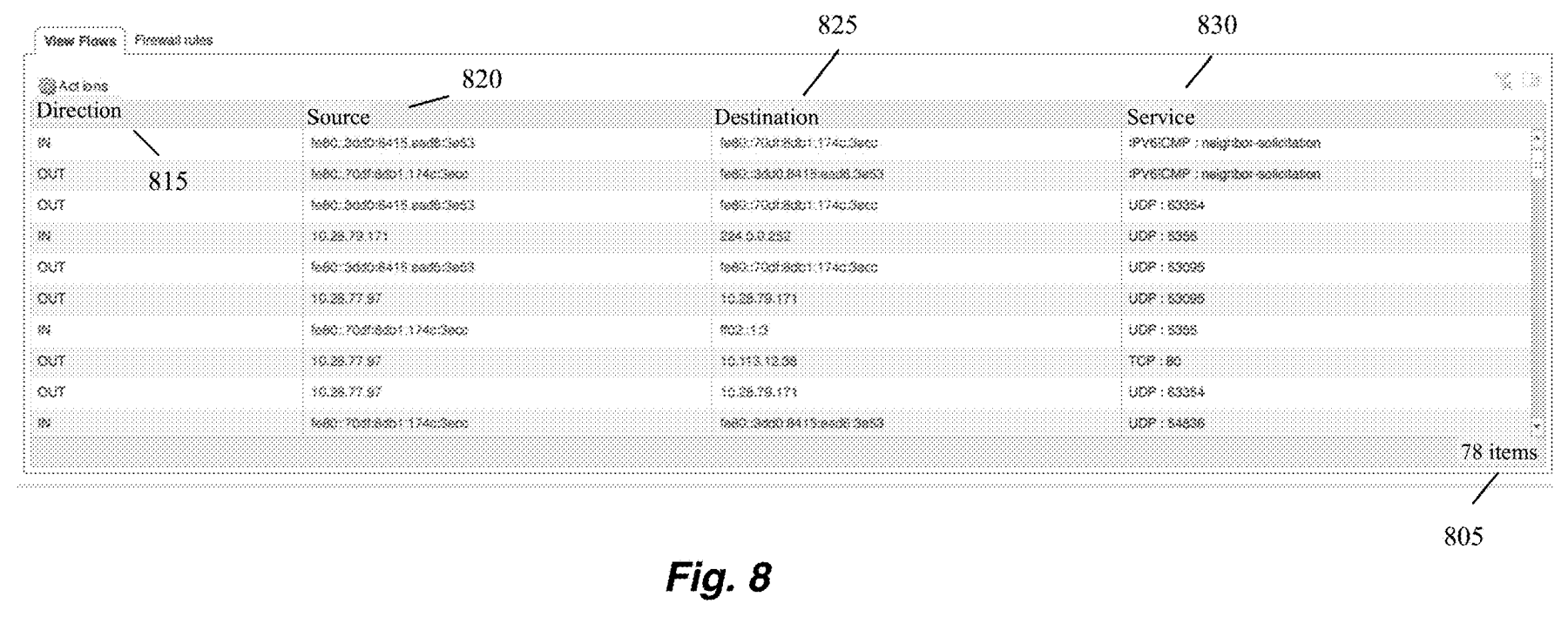

FIG. 8 illustrates an example a portion of a GUI in some embodiments while the monitoring stage is in progress. As shown the GUI indicates that 78 flows are collected (as indicated by 805) so far. The flow information collected includes flow direction 815, source IP 820, destination IP address 825, and service type and port pairs 830.

Figure 9:
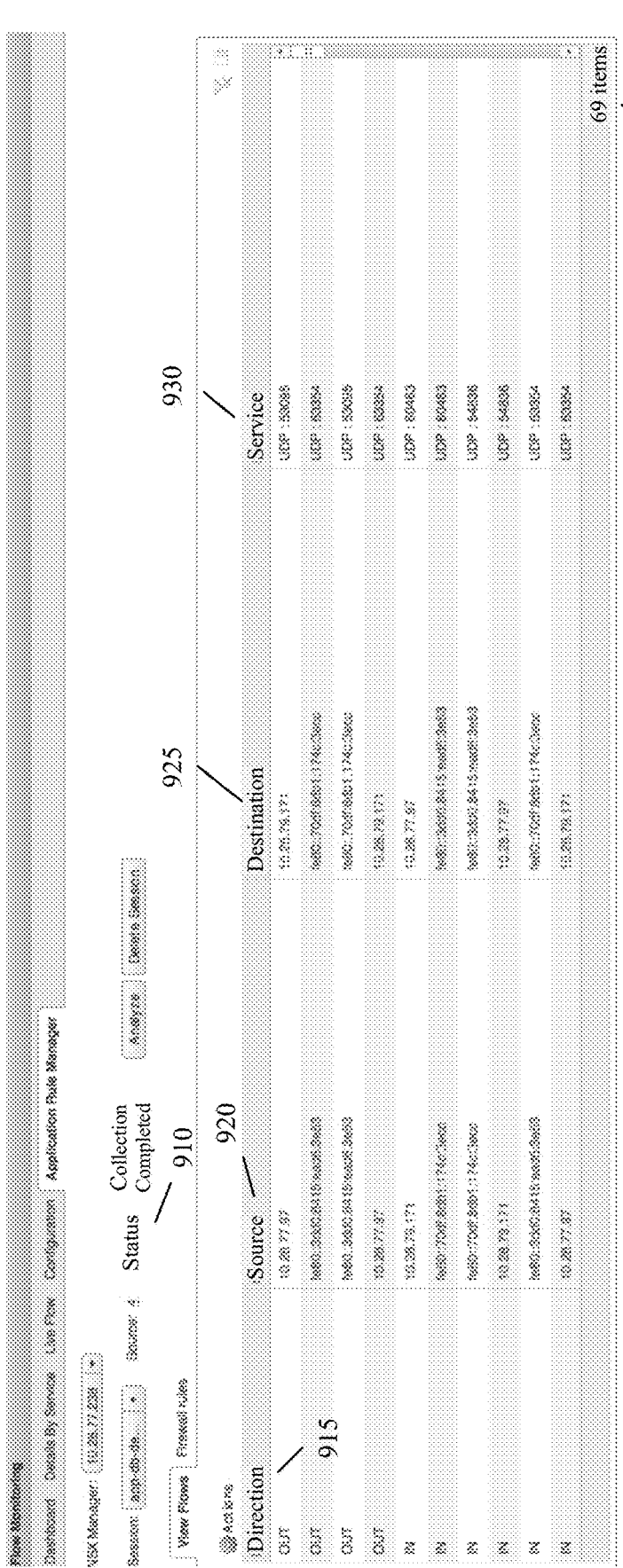
FIG. 9 illustrates an example of a GUI after the monitoring stage is completed.

FIG. 9 illustrates an example of a GUI after the monitoring stage is completed. As shown the GUI status 910 indicates that flow collection is completed and 69 flows are collected (as indicated by 905) after the duplicate flows (e.g., flows related to multicasting or broadcasting) are removed. The flow information collected includes flow direction 915, source IP address 920, destination IP address 925, and service type and port pairs 930.

Figure 10:
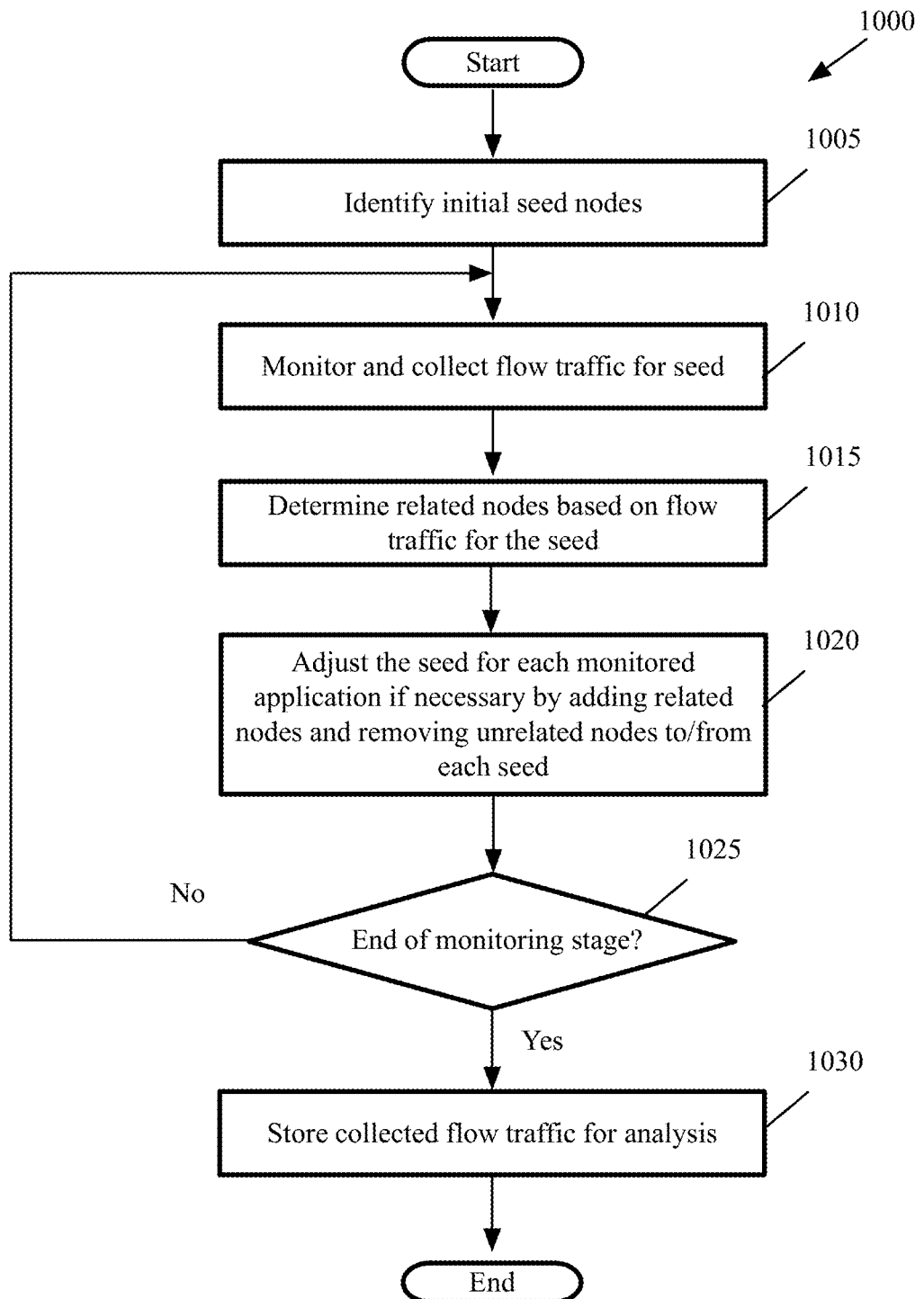
FIG. 10 conceptually illustrates a process for performing packet flow monitoring in some embodiments.

FIG. 10 conceptually illustrates a process 1000 for performing packet flow monitoring in some embodiments. Process 1000 describes further details for operation 205 of process 200 in FIG. 2. As shown, process 1000 identifies (at 1005) the initial seed node (or nodes) for one or more applications. For instance, the process identifies seed nodes 405-420 for different applications as shown in stage 401 in FIG. 4.

The process then monitors and collects (at 1010) traffic flow information for the seed nodes. The process then determines (at 1015) nodes that are related to the seed nodes based on the collected flow information. The process the adjusts (at 1020) the seed for each application if necessary by adding or removing nodes to/from each seed. For instance, the process adds nodes 425, 445, and 460 to seed 405 (as shown in stage 402 in FIG. 4) when the process determines that nodes 425, 445, and 460 are related to seed 405. Similarly, the process may remove nodes from a seed once the process determines a node is not related to an application.

The process then determines (at 1025) whether the monitoring stage is to be ended. For instance, in some embodiments the monitoring stage is ended after a configurable period. In other embodiments, the monitoring stage is ended after a predefined period (e.g., several days) and the user is provided with a tool to stop or extend the monitoring period.

When the monitoring stage is to be continued, the process proceeds to 1010, which was described above. Otherwise, the process stores (1030) the collected flow traffic for analysis (e.g., for use by the analytics engine 125 in FIG. 1).

B. Flow Analysis Stage

The flow collector 185 in FIG. 1 in some embodiments is located in the kernel space of virtualization software of the host and as the packet forwarding engine of the MFE 180 is based on IP addresses, the flow collected during the monitoring stage is also represented in terms of IP addresses. A flow tuple collected typically looks like {source ip, source port, destination port, destination ip, protocol, direction}.

The users, however, view an application in terms of VMs and would like to see the flows in the similar terms and not in terms of static IP addresses. The flow analysis in some embodiments is performed by the network virtualization manager (e.g., by analytics engine 125 in FIG. 1). In some embodiments, the network virtualization manager 110 in FIG. 1 queries the deployment topology 135 from the compute manager through the compute manager interface 145.

As the network virtualization manager has the full picture of the datacenter in terms of compute inventory and network configuration, the network virtualization manager uses that information to convert the raw information collected during the monitoring stage into information that is understandable by the users. The flow analysis stage in some embodiments is a heuristic process which adds the following information to the raw flow collected at the hypervisor level.

Figure 7:
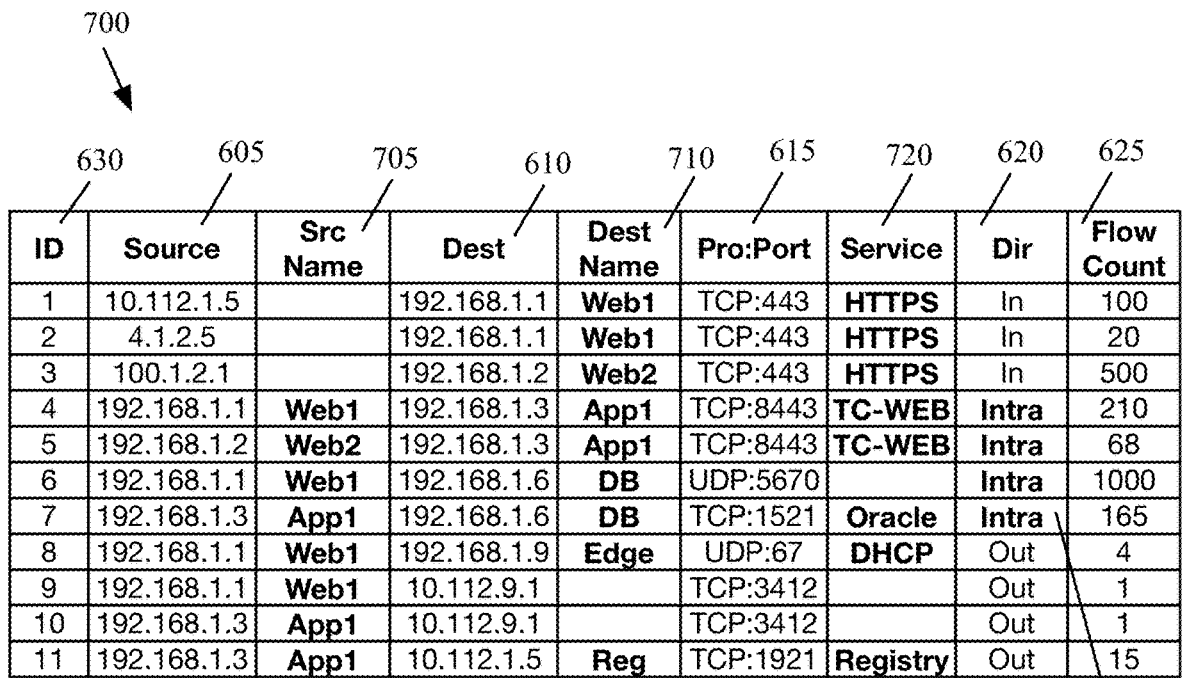
FIG. 7 conceptually illustrates translation of the information in the table shown in FIG. 6 into terms that are better understood by the users.

During the flow analysis stage, IP addresses are converted into VMs by using reverse translations based on the compute inventory and network configuration. FIG. 7 conceptually illustrates translation of the information in table 600 shown in FIG. 6 (which is collected during the monitoring stage) into terms that are better understood by the users. As shown in table 700, the IP addresses are converted into a set of acronyms that identify the source 705 and destination 710 of each flow.

The direction of the flow collected during the monitoring stage is identified either as "in" or "out" based on whether the flow is originating from the VNIC or coming to the VNIC. Since all members in the seed for which a monitoring session is running are known, the flows are further classified during the flow analysis stage as "intra" (as shown by 715) to denote that the flow is originating within the seed.

The port and protocol information is also translated into services 720. The services can be pre-defined services (such as HTTP, HTTP secure (HTTPS), DHCP, etc.) or user defined services (such as backup service, Oracle, etc.) using reverse translations. Some of the information is found by direct match that results in a unique translation, while others match to multiple information. For instance, there may be multiple definition HTTP, MyHTTPServer, Apache-Web-Server etc., for the protocol and port pair TCP:80. All these matches in some embodiments are presented to the user. As shown, some entries in the source name 705 and destination name 710 are not resolved to a particular name and are left blank. For instance, these entries may correspond to IP addresses for entities outside the datacenter. Similarly, some protocol:port pairs may not be associated with a particular service and are, therefore, left blank in Table 700.

Figure 11:
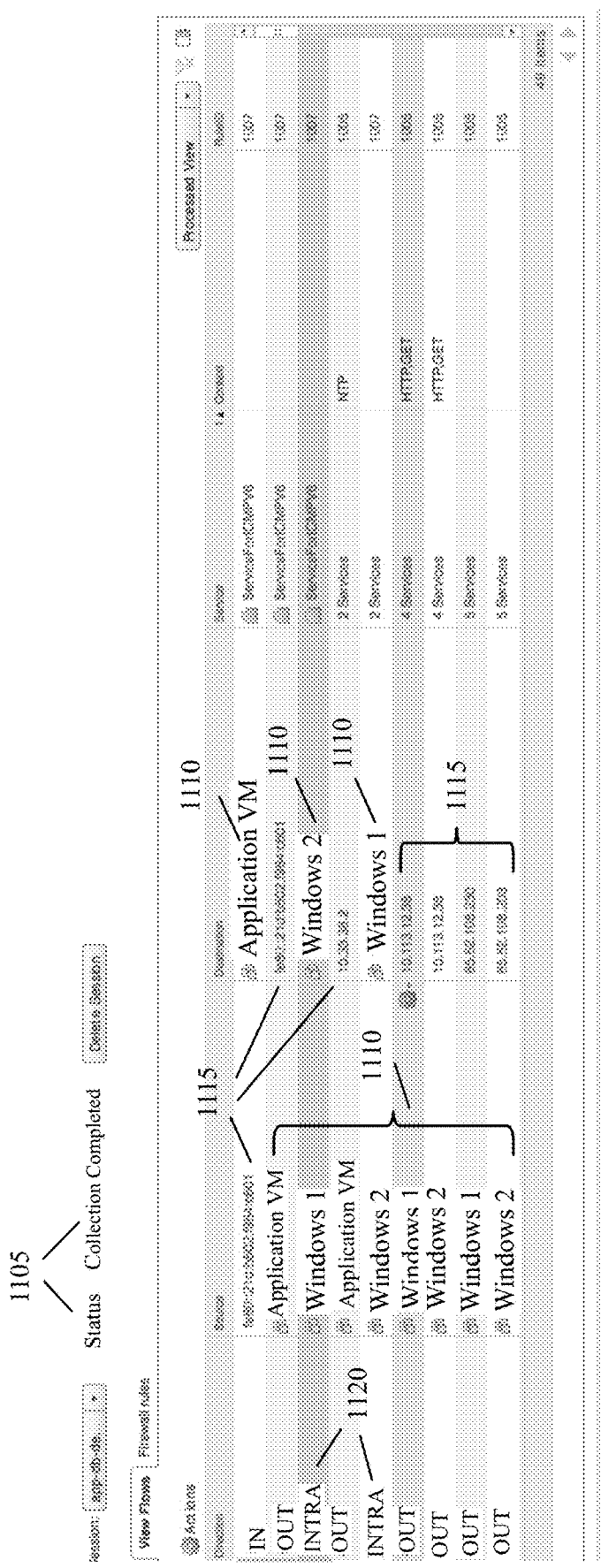
FIG. 11 illustrates an example of a GUI in some embodiments after the analysis stage is completed.

FIG. 11 illustrates an example of a GUI in some embodiments after the analysis stage is completed. As shown, the GUI status 1105 indicates that the analysis stage is completed. The GUI also shows that several source and destination IP addresses are translated into VM names 1110. The VMs may either be tenant (or workload) VMs or service VMs.

FIG. 11 also shows that several IP addresses 1115 are not translated into object names. These IP addresses, for example, correspond to objects outside the datacenter, which cannot be resolved into object names using the datacenter object inventory. The figure also shows that several flow directions 1120 where the flows have originated within the seed are labeled as intra.

C. Data Reduction Stage

The monitoring session may go on for days or weeks, during which thousands of flows may be collected. The results in some embodiments is paged and presented to the user one page at a time. The data reduction stage provides user tools such as filters, reverse lookup suggestions, hide, and delete to enable the user to morph the thousands of flows into a limited number of flows which represent a high level diagram of the traffic flowing within the application.

Figure 12:
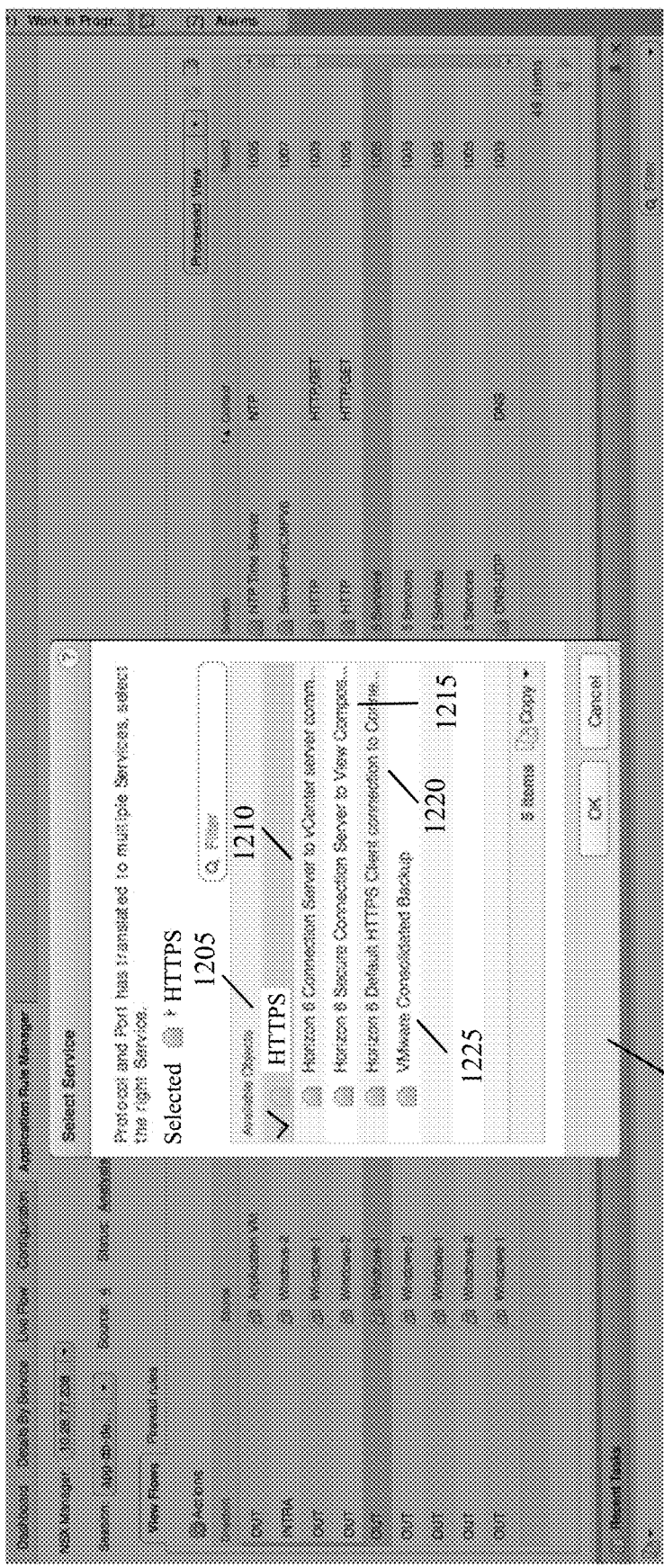
FIG. 12 illustrates an example of a GUI in some embodiments that provides a tool for resolving conflicts.

FIG. 12 illustrates an example of a GUI in some embodiments that provides a tool for resolving conflicts. The GUI allows a user to select one of multiple services that are reverse translated from the same protocol and port. As shown in the pop up window 1260, the same protocol and port is reverse translated into 5 services 1205-1225. As shown, the user has selected HTTPS service 1205 as the correct service.

Figure 13:
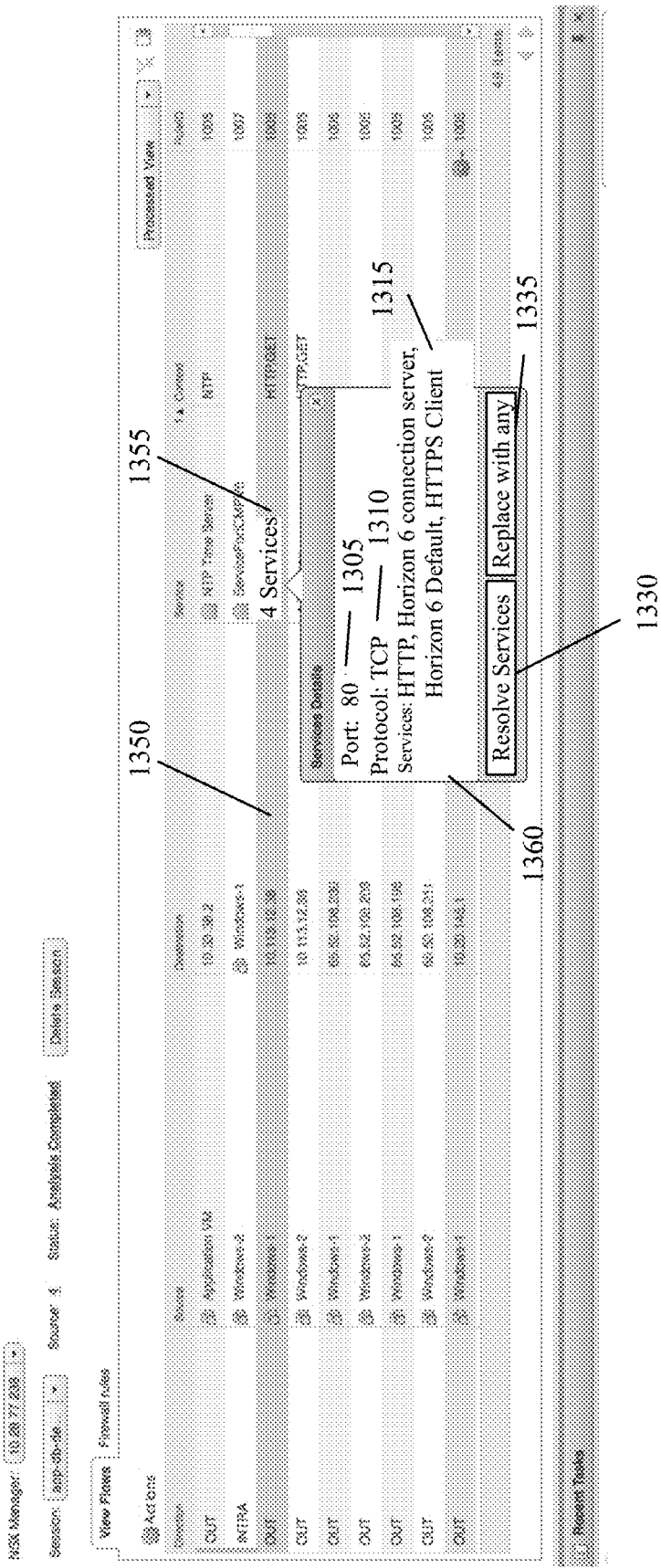
FIG. 13 illustrates another example of a GUI in some embodiments that provides a tool for resolving conflicts.

FIG. 13 illustrates another example of a GUI in some embodiments that provides a tool for resolving conflicts. In this example, a particular flow 1350 is reverse translated into 4 services (as shown by 1355). Once the user selects the portion of the flow that indicates 4 services (e.g., by clicking on the GUI area 1355 by a selection tool such as a cursor or by just hovering the selection tool over the area 1355), a pop up window 1360 is displayed. The pop up window indicates that port 80 1305 and protocol TCP 1310 can be resolved into 4 services 1315 and lists the four services.

As shown, the user is provided by two options to either manually resolve the conflict (as shown by 1330) or to replace the protocol and port pair (as shown by 1335) by any of the 4 services. In some embodiments, selection of option 1230 brings up a pop up window similar to pop up window 1260 in FIG. 12 to allow the user to select one of the multiple services.

Figure 14:
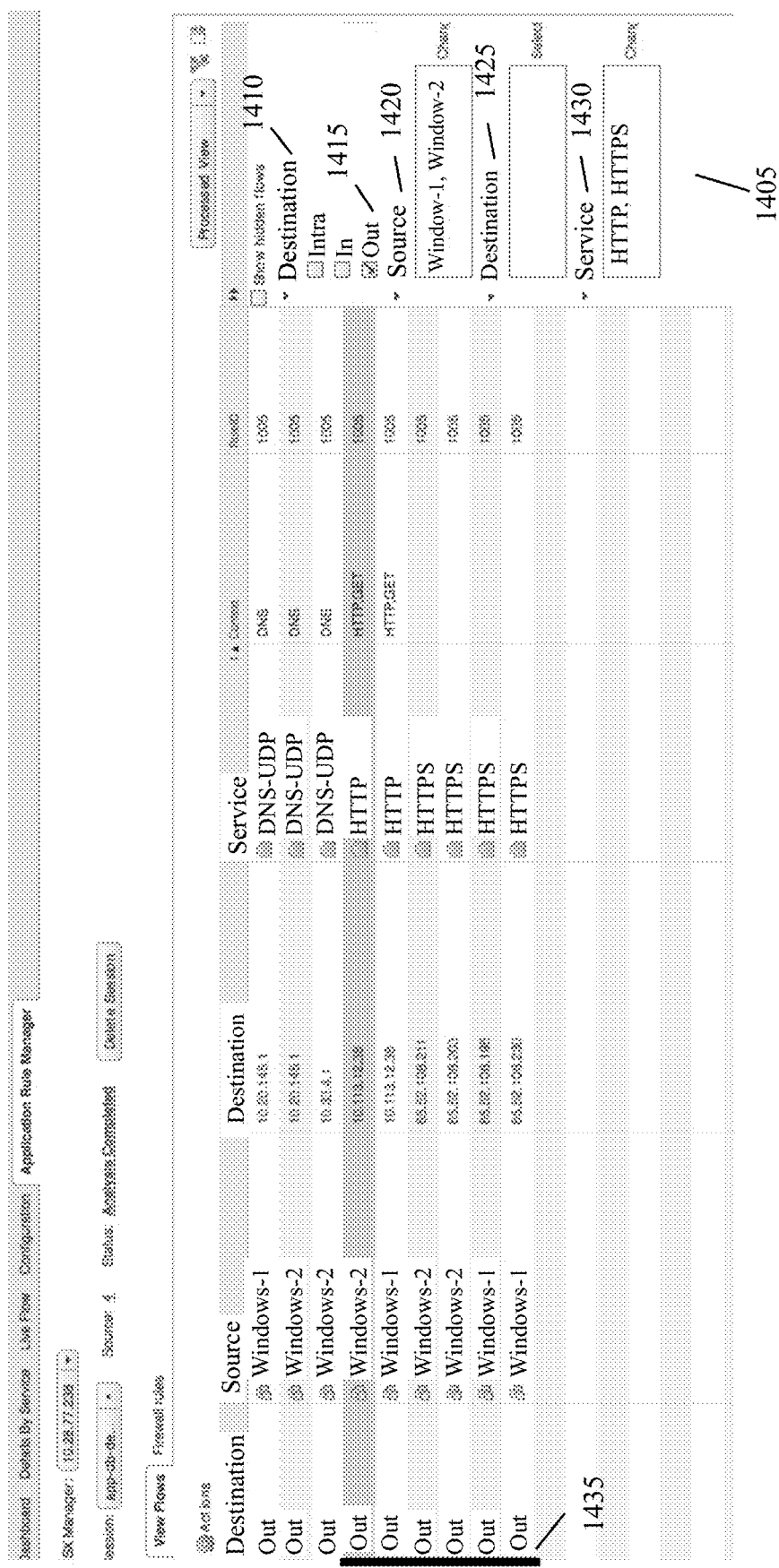
FIG. 14 illustrates an example of a GUI in some embodiments that provides a filter to apply to flows in order to filter several flows.

FIG. 14 illustrates an example of a GUI in some embodiments that provides a filter to apply to flows in order to filter several flows. As shown, the GUI provides a display area 1405 to apply filters to a set of flows. In this example, the user has selected flows with destination 1410 of "Out" 1415, a source 1420 that is translated to either Windows-1 or Windows-2, and a service 1430 that is either HTTP or HTTPS. The user has not entered any filtering criteria for the destination 1425. Some embodiments provide a visual indication such as a bar 1435 in front of any flows that has been modified by the user.

Figure 15:
FIG. 15 conceptually illustrates a reduced set of flows that are generated from the flows shown in FIG. 7.

FIG. 15 conceptually illustrates a reduced set of flows that are generated from the flows shown in FIG. 7. As shown in FIG. 15, the number of flows are reduced. For instance, in the example of FIG. 15, some flows from table 700 and 1500 that are originated from outside of the datacenter and are received at the "web server of application 1" 1505 are grouped together and the source is identified as "any" 1510. Other flows may be eliminated or hidden.

D. Rule Creation Stage

Reducing and morphing the flows into a smaller number of flows provides a clear picture of the kind of traffic that is flowing through an application. The firewall rules that are needed to enforce security on the application are then provided based on the reduced number of flows. As shown in stage 403 in FIG. 4, the flows between different VMs are identified (as conceptually shown by the lines connecting different VMs in the figure). Group of related VMs (e.g., VMs that are connected to the same logical network 460 or 465) are identified based the flows communicated between different VMs.

Figure 16:
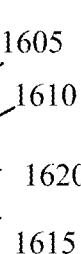
FIG. 16 conceptually illustrates a set of firewall rules that are created for the data shown in FIG. 15.

In some embodiments, the firewall rules are machine driven and presented to the user. The user is also provided with tools to create firewall rules or modify the machine driven rules. FIG. 16 conceptually illustrates a set of firewall rules that are created for the data shown in FIG. 15. As shown in FIG. 16, flows are allowed or denied based on different criteria. for instance, any flows (including flows from outside the datacenter) may be allowed (as shown by 1605) to a web server.

Similarly, flows from web servers to application servers and flows from application servers to database servers may be allowed (as shown by 1610 and 1615, respectively). On the other hand, flows from a web server to a database server may be denied (as shown by 1620). Other firewall rules are derived based on different application related criteria.

As conceptually shown in stage 404 in FIG. 4, some flows such as flows 470 between web servers and application servers and flows 475 between application servers and database servers my be allowed. On the other hand, flows 480 between web servers and database servers may be denied.

Figure 17:
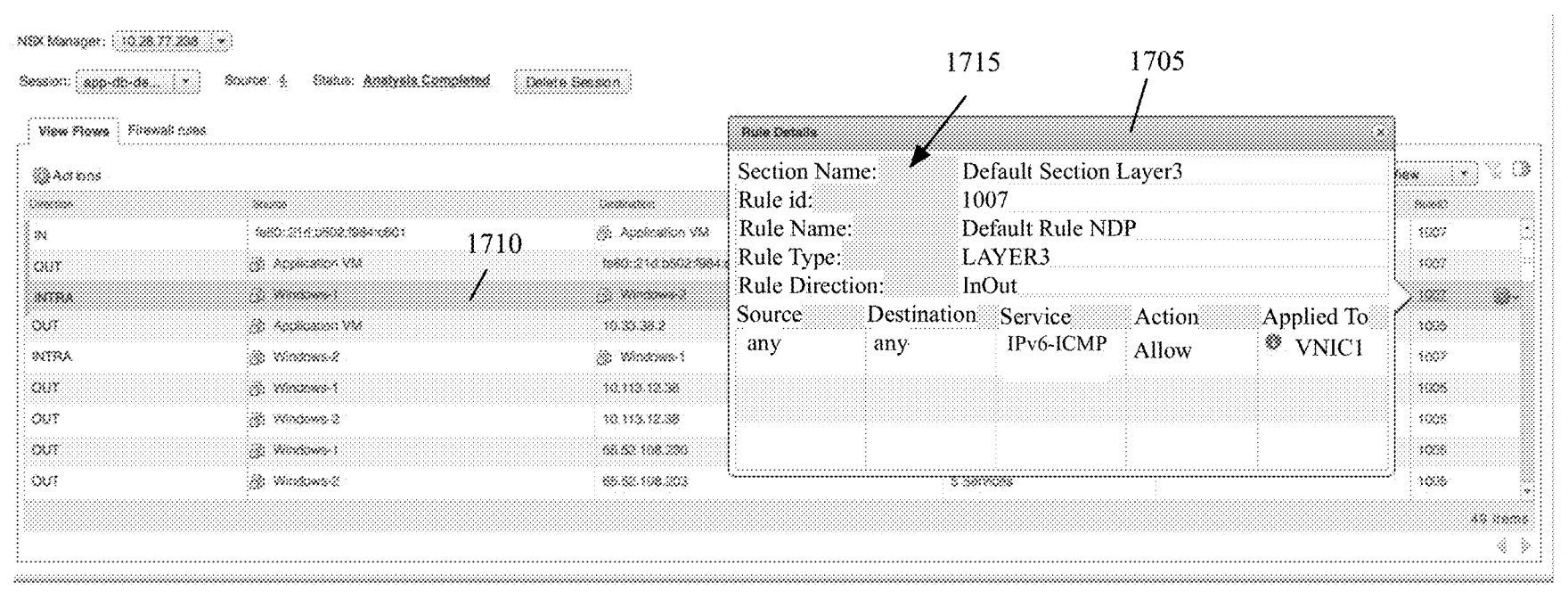

FIG. 17 illustrates an example of a GUI in some embodiments showing rule details that are provided for a particular flow. As shown, the pop up window 1705 provides the rule "source=any, destination=any, service=IPV6-ICMP, allow" for a selected flow 1710. In this example, the pop up window 1705 also provides further details 1715 such as section name, rule identification, rule name, rule type, and rule direction for the provided rule.

Figure 18:
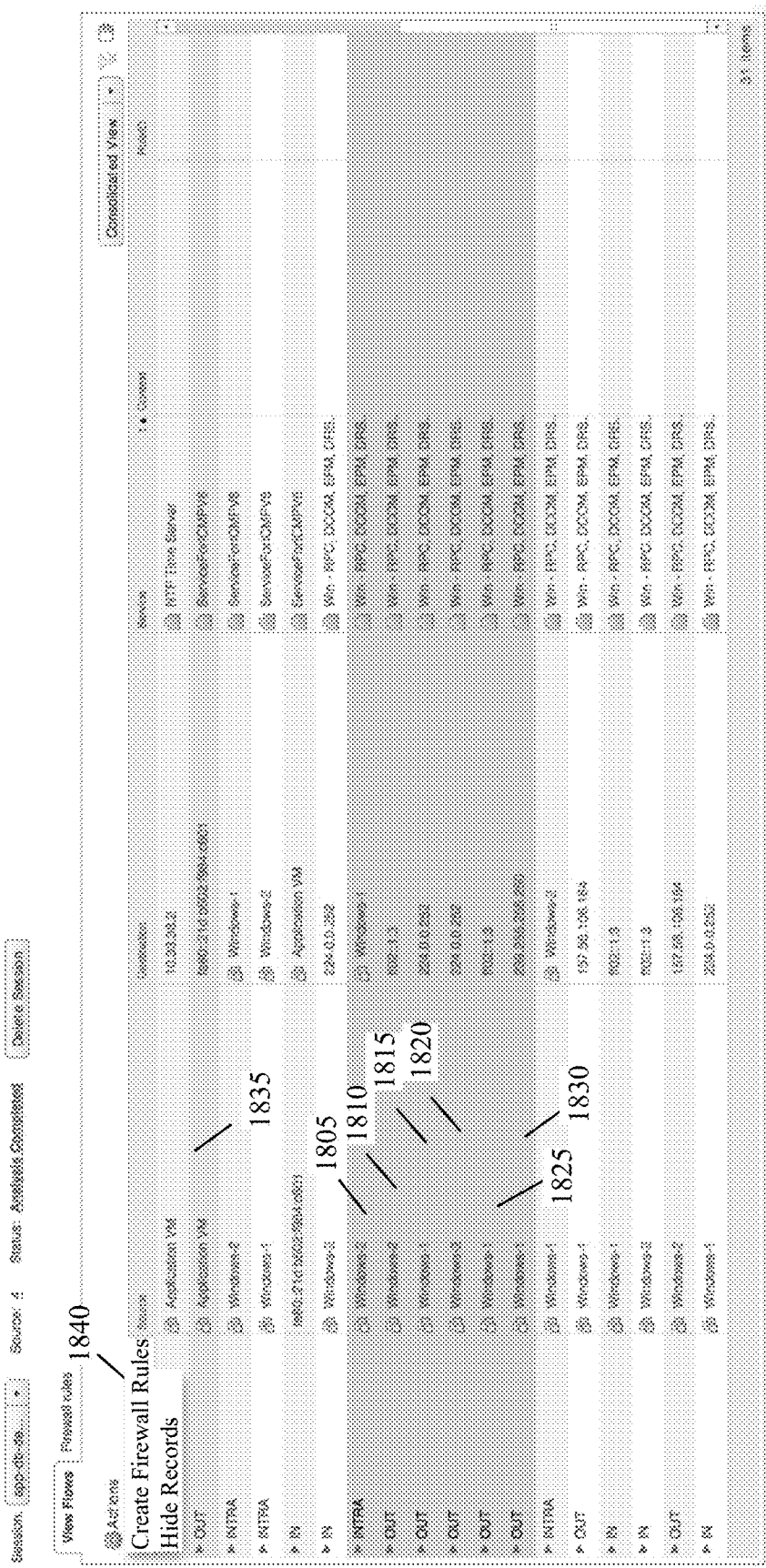
FIG. 18 illustrates an example of a GUI in some embodiments where several flows are selected in order to provide firewall rules.

FIG. 18 illustrates an example of a GUI in some embodiments where several flows are selected in order to provide firewall rules. As shown, flows 1805-1835 are selected. An option 1840 is selected in order to create firewall rules for the selected flows 1805-1835.

Figure 19A:
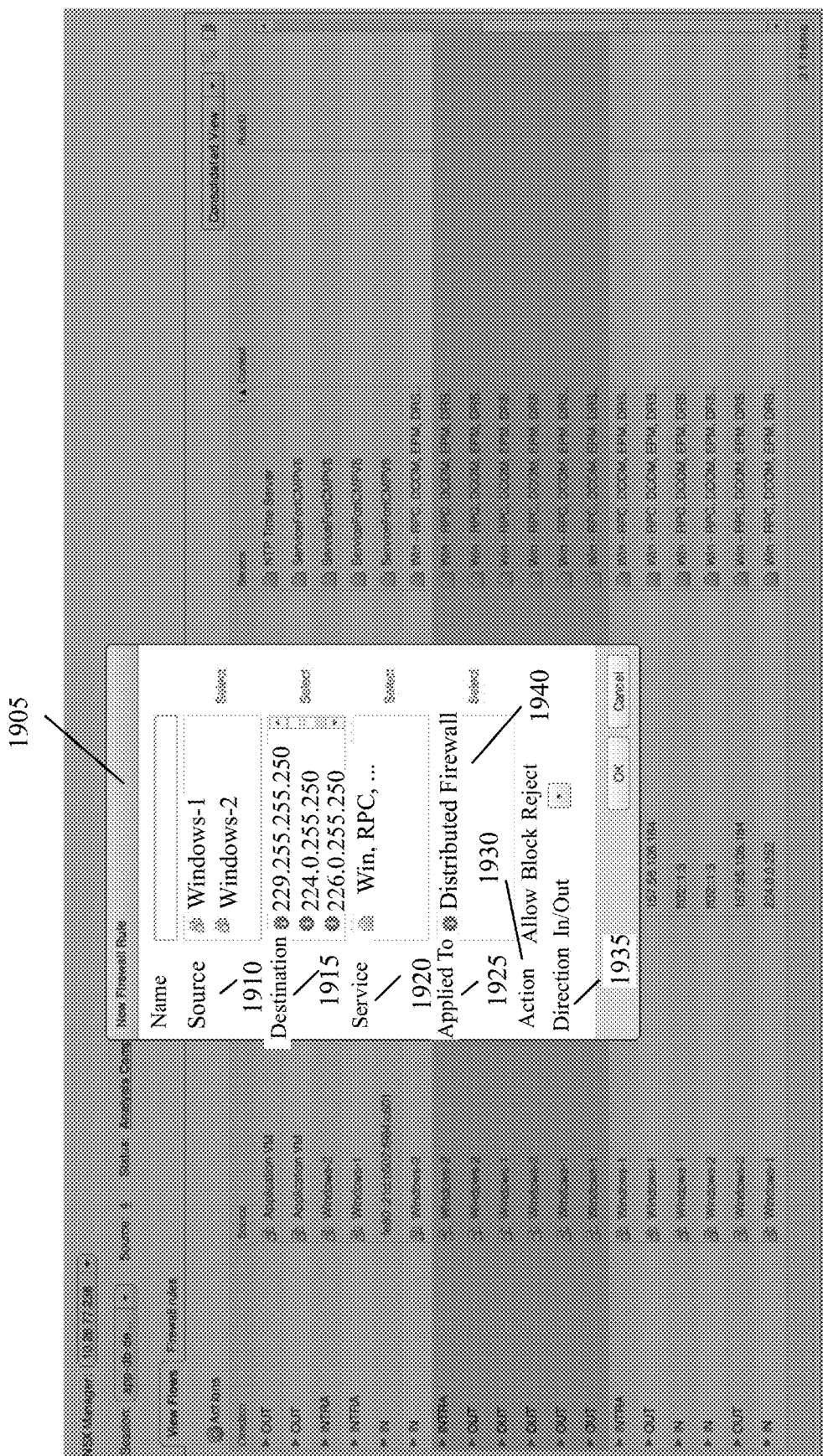
FIG. 19A illustrates a GUI in some embodiments after a new firewall rule is generated.

FIG. 19A illustrates a GUI in some embodiments after a new firewall rule is generated. As shown, the pop up window 1905 illustrates a rule that is generated based on particular values for the source 1910, destination 1915, service type 1920, location where the rule has to be applied 1925, the action (i.e., allow, block, reject) 1930, and the direction of the flow 1935. The "AppliedTo" tuple 1925 in a firewall rule lists a set of enforcement points (e.g., network nodes) at which the firewall rule has to be applied. In some embodiments, the enforcement points can be defined in terms of (1) VNICs, VMs, hosts, or other compute constructs (e.g., compute clusters, datacenters, etc.), (2) network elements, such as managed forwarding elements, a logical forwarding elements, other managed appliances, unmanaged third-party appliances (e.g., third party firewalls), and/or combination of such elements, and/or (3) security groups that are formed by a set of one or more VNICs, VMs, hosts, compute constructs and/or network constructs. In this example, the "AppliedTo" tuple 1925 indicates a distributed firewall 1940 as the enforcement point.

Figure 19B:
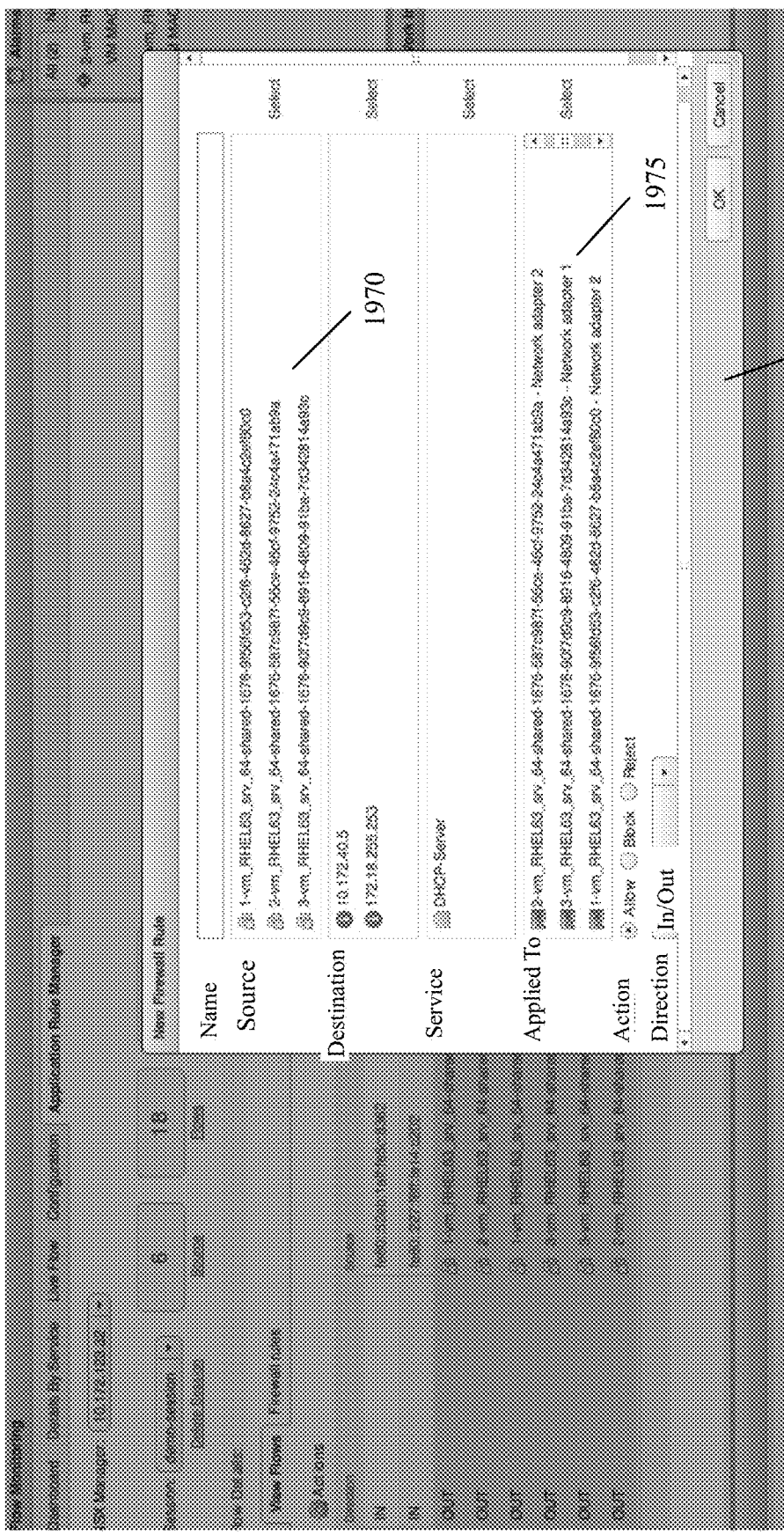
FIG. 19B illustrates a GUI in some embodiments after a set of firewall rules is generated.

FIG. 19B illustrates a GUI in some embodiments after a set of firewall rules is generated. As shown in the pop up window 1965, the set of rules 1970 includes a corresponding set of "AppliedTo" tuples 1975 to indicate the enforcement point for each rule. In some embodiments, the "AppliedTo" tuple is automatically set to the VNIC of the seed nodes (e.g., the seed nodes identified by process 1000 described above.

E. Rule Reviewing Stage

After the flows are morphed into a smaller number of flows and firewall rules are generated, the rules have to be enforced. As the firewall rules are written with the context of an application, the rules are agnostic of the rest of the datacenter. So the rules need to be reviewed by the security administrator from that perspective.

Figure 20:
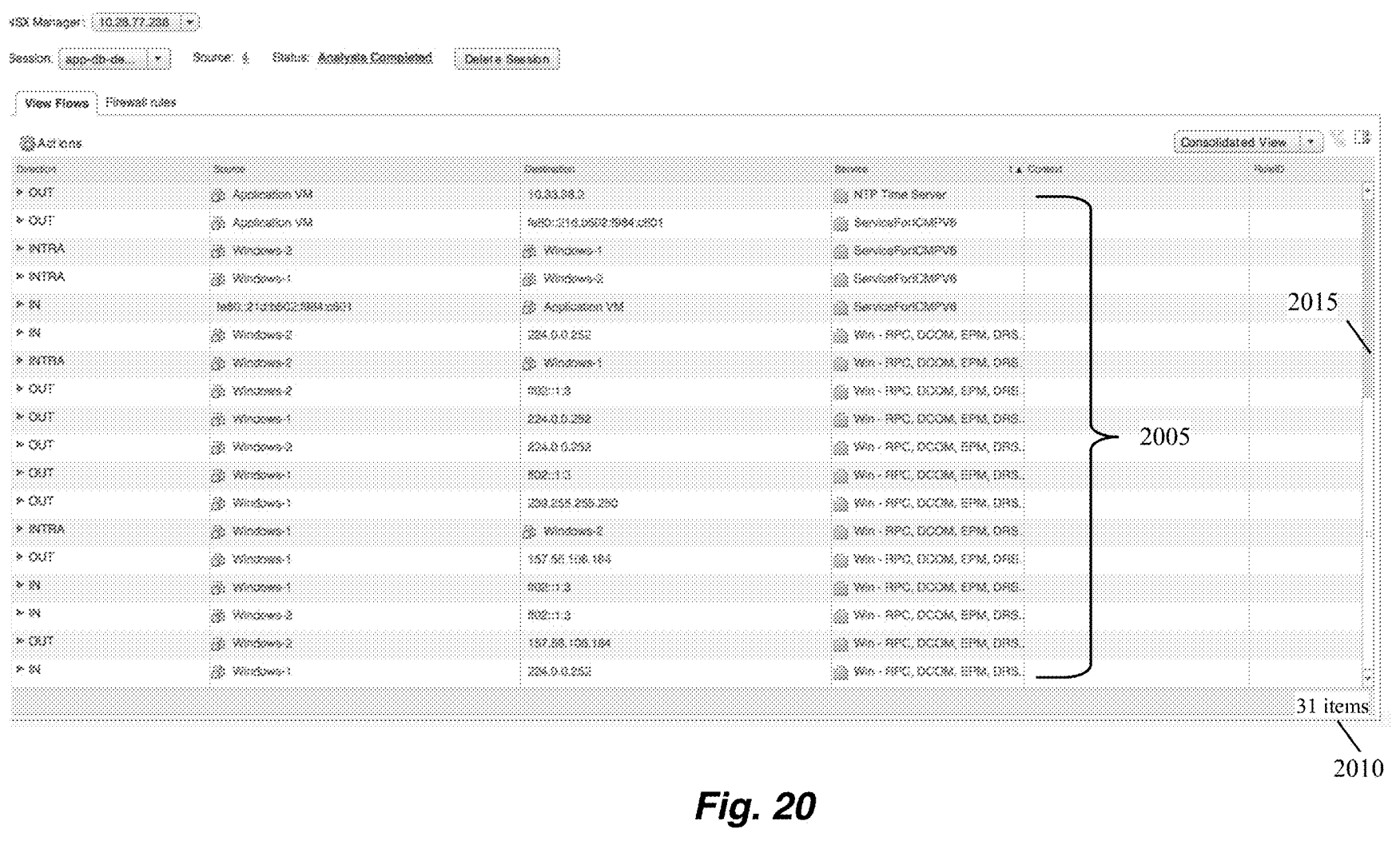

FIG. 20 illustrates an example of a GUI in some embodiments that displays a consolidated view of several flows. As shown, the consolidated view includes 31 flows (as shown by 2010), 18 flows 2005 are currently displayed on the GUI. Other flows can be displayed by using a tool 2015 to scroll down the display.

Figure 21:
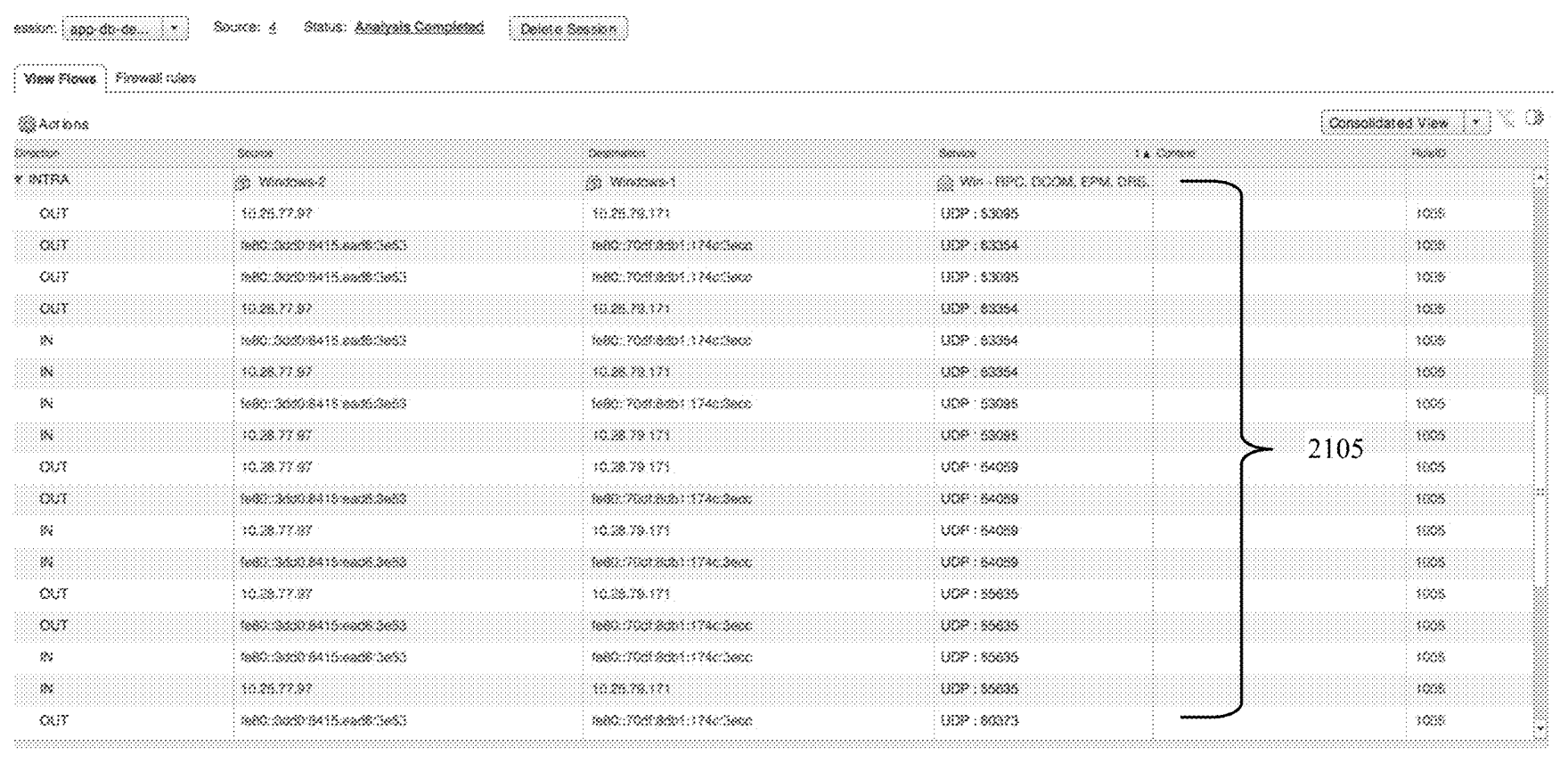

FIG. 21 illustrates an example of a GUI in some embodiments that displays an expanded view showing all raw flows that are consolidated into a single flow. As shown, selecting any one of the consolidated flows 2005 in FIG. 20 results in an expansion view 2105 that provides details of individual flows 2105 in the selected consolidated view.

The user in some embodiments can export the morphed flows and the firewall rules and send them to the security administrator for the review process. The flows (e.g., flows in the example of FIG. 15) provide insight on why the rules are needed. As the security administrators also have full context of the security enforced by DFW in the datacenter, the administrators can edit this configuration in the context of the datacenter. For instance, the administrators can remove the unnecessary rules which might be already present in system as a part of some system administrator rules block. The administrators can also fine tune rules for enforcement.

F. Rule Enforcement Stage

Once the review of the firewall rules has been done by the security administrator, the rules can be enforced in the system. To enforce the rules in the system, the rules should be appended to the existing fire wall rules. For instance, the rules should be appended to the DFW configuration.

This stage provides the user the ability to pick and choose where these firewall rules are placed in the actual firewall rule table to provide security for the application. The rules can be patched in the same firewall section which was created during the monitoring stage or can be added as a new section in an existing configuration.

Figure 22:
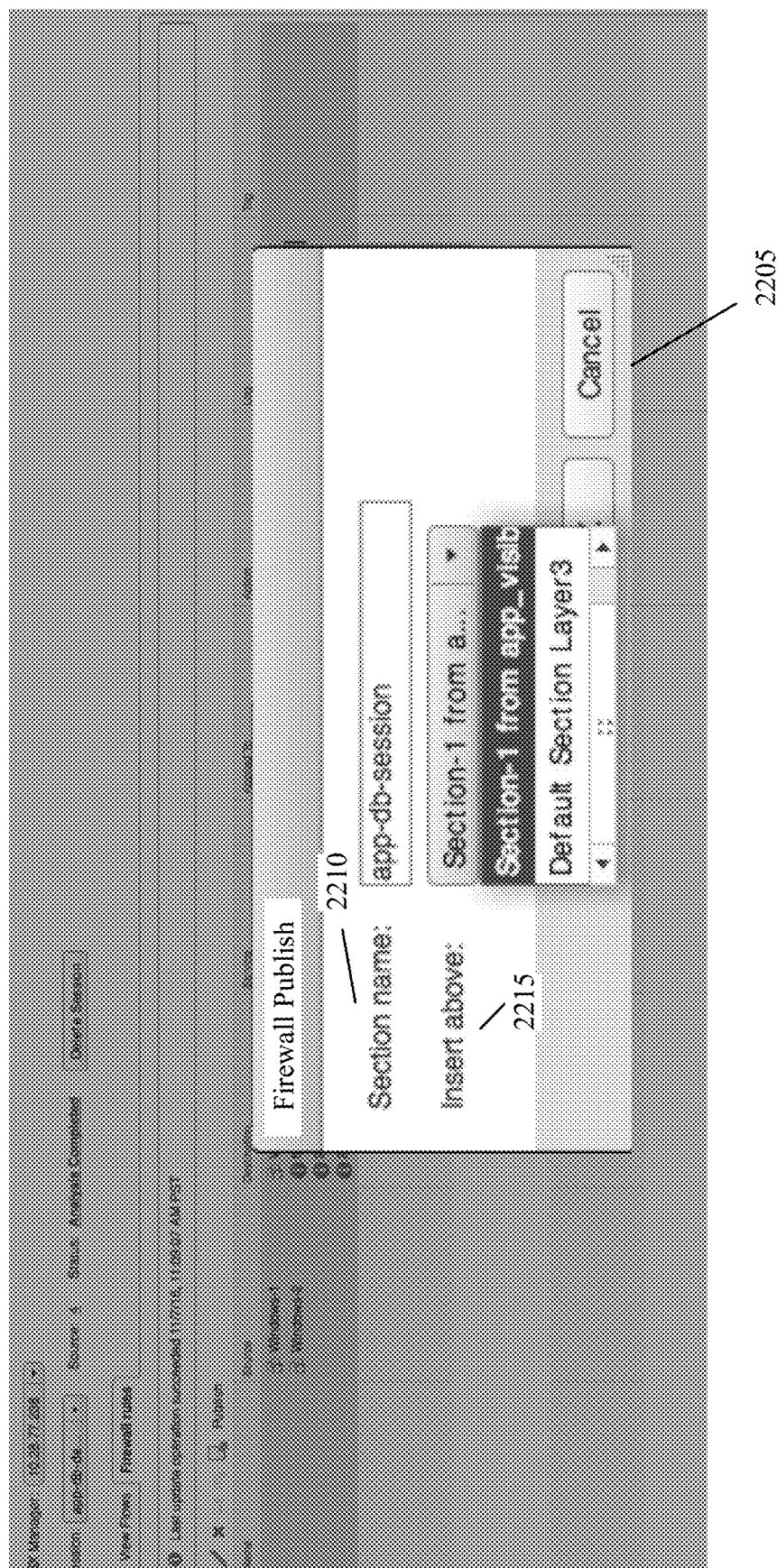
FIG. 22 illustrates a GUI in some embodiments for publishing firewall rules.

FIG. 22 illustrates a GUI in some embodiments for publishing firewall rules. As shown, the pop up window 2205 is provided to publish firewall rules. The user can select the particular firewall rule section 2210 that the new rule is to be appended. The user can also select the location 2215 in the particular section to insert the new firewall rule.

Figure 23:
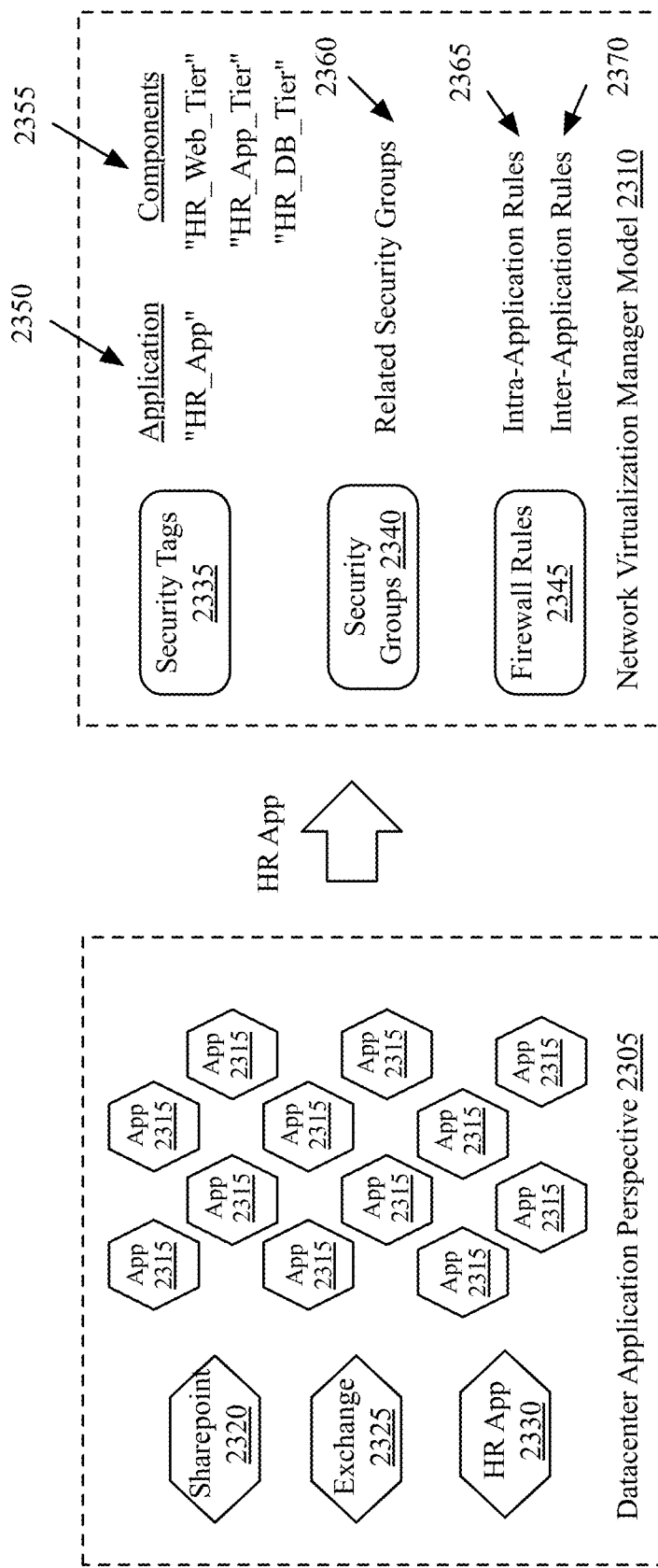
FIG. 23 conceptually illustrates different views of an application from the perspective of the datacenter and the network virtualization manager.

The above multi-stage process revolves around micro-segmentation. A user picks his/her current view of the micro-segmentation of the datacenter in the form of an application and starts looking at the flows from that perspective and not the datacenter as a whole which could be an overwhelming experience. FIG. 23 conceptually illustrates different views of an application from the perspective of the datacenter and the network virtualization manager. As shown, the complicated datacenter perspective 2305 includes many applications 2305-2330, most of which may not be of interest to a tenant. The applications includes a multi-tiered application 2330 for a human resources (HR) department ("HR App") to which a particular tenant is interested.

The network virtualization manager model 2310 for the "HR App" provided by the above-mentioned multi-stage process includes details such as security tags 2335, security groups 2340, and firewall rules 2345. Security tags are user-defined objects to which one or more VM objects can be associated. The security tags give more flexibility to the end user in deployments where the VMs do not follow a naming pattern or the name may be changed. Security groups are grouping constructs that group datacenter elements such as security tags, IPSets, and MAC Sets. A MAC Set includes a set of MAC addresses and an IPSet includes a set of IP addresses.

In the example of FIG. 23, the network virtualization manager model 2310 for the "HR App" provides detailed information such as application name 2350, components 2355 of the application (in this example, HR application is a 3-tiered enterprise application), related security groups 2360, intra-application firewall rules 2365, and inter-application firewall rules 2370.

This application can be used either by an enterprise user or a tenant in a public/private cloud to provide security for the workload that the user cares about and the provided view is limited with regard to the selected workload itself. The multi-stage process can be used as a tool at "day-0" for the onboarding process for micro-segmentation in a brownfield deployment where the user start consuming the network virtualization manager after the system deployment. The tool can also be used after the deployment to get better application visibility.

II. Visualizing Packet Flows of a Network

Some embodiments provide a method that is used in an environment that does not include a network virtualization manger to generate a network topology for a set of applications (e.g., three tiered enterprise applications). The method, without an actual knowledge of the network topology, monitors communication flows and creates a network graph. The method also uses data collected by a network flow analyzer from hosts virtualization software and creates a flow graph. The flow graph is then used to generate suggestions for security groups, which can be used in firewall Rules.

The security groups are then used for creating suggestions for firewall rules. For instance, the rules may allow HTTP traffic for the web servers but do not allow web servers to communicate with each other. As another example the suggested firewall rules may recommend blocking traffic that originate from a web server with a destination that is outside the local network.

Figure 24:
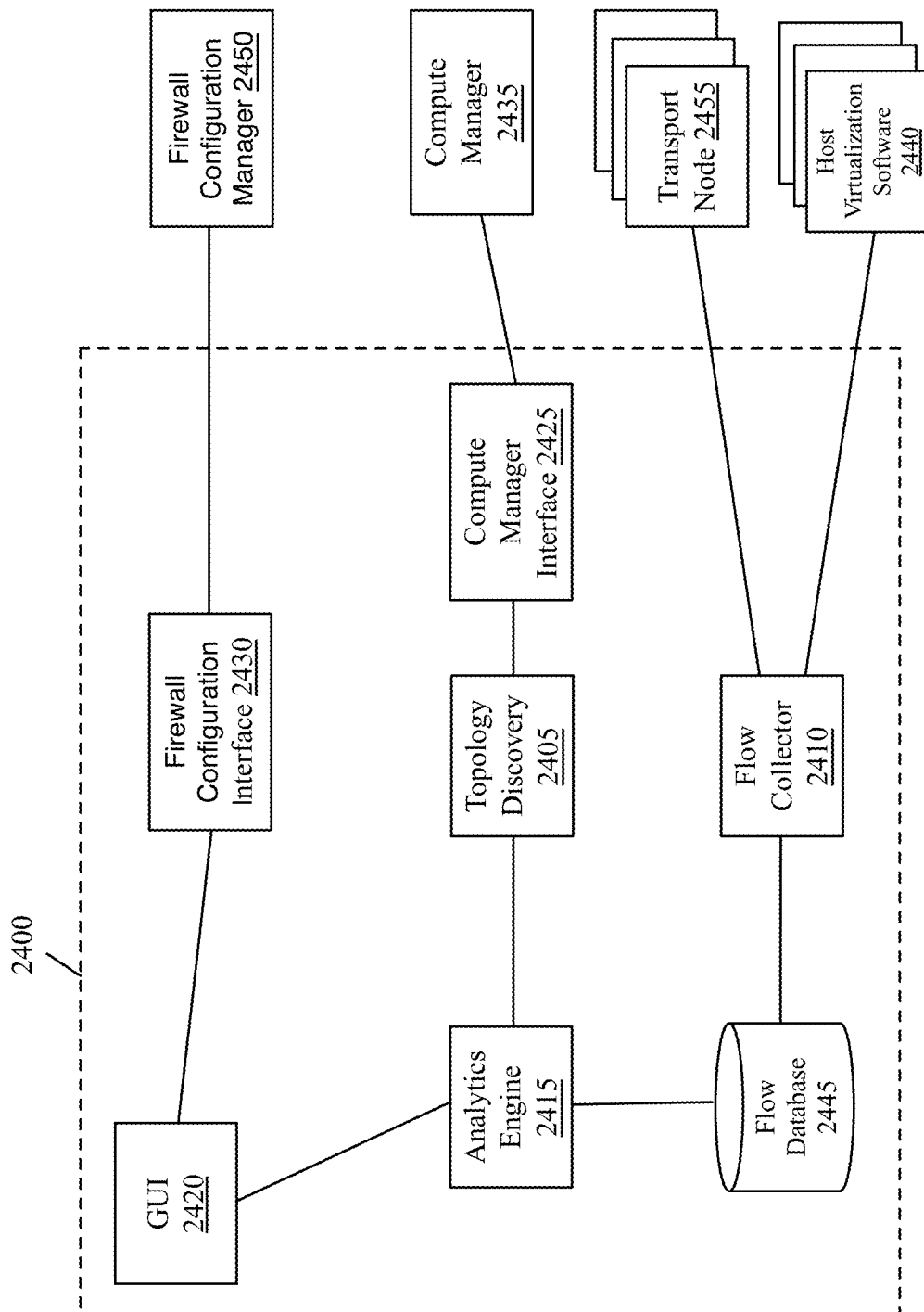
FIG. 24 conceptually illustrates a packet visualization tool in some embodiments.

Some embodiments provide a tool for packet flow visualization. FIG. 24 conceptually illustrates a packet visualization tool 2400 in some embodiments. As shown, the tool includes a topology discovery component 2405, a flow collector 2410, an analytics engine 2415, a GUI 2420, an interface 2425 such as a plugin to interface with a compute manager 2435 of the datacenter, and an interface 2430 such as a plugin to configure distributed firewall rules. The tool in FIG. 24 provides similar functionality as the system described above by reference to FIG. 1. However, tool 2400 operates independently from the network virtualization manager of the datacenter. Tool 240 does not utilize the network virtualization manager's object inventory for determining network topology and can function when the datacenter does not include a network virtualization manger.

Topology discovery component 2405 discovers the deployment topology. For instance, the topology discovery component 2405 in some embodiments interfaces with the compute manager server 2430 of the datacenter to get the compute manager server's deployment inventory and create a map for different entities. In some embodiments, the topology discovery component 2405 utilizes an interface 2425 (such as a plugin and/or an API) to receive topology information such as VM to host mappings from the compute manager 2435. The topology information in some embodiments includes VM identifiers, VM names, port group identifiers, port group names, IP addresses, MAC addresses, and subnet prefix lengths.

Flow collector 2410 performs flow discovery by collecting flow information from the virtualization software 2440 of the hosts as well as other transport network nodes (e.g., gateways) 2455 using a network protocol such as NetFlow that allows collection and monitoring of network traffic flow. Information such as source and destination IP addresses, protocol, source and destination ports, protocol, virtual local area network (VLAN) identifier, and byte count for each flow is collected and stored in a database 2445. In some embodiments, an MFE in the host is programmed to provide the flow information. The flows are further classified into different east-west traffic.

Analytics engine 2415 retrieves data from the topology discovery component 2405 and the database 2445 populated by flow collector 2410 and determines the relationships between the VMs and groups the VMs. The GUI 2420 queries inventory from the compute manager 2435 and the flow data from analytics engine 2415 to provide a visual topology to the user for making rule recommendations and creating security groups. The GUI uses the interface 2430 (e.g., a plugin or an API) to interact with firewall configuration manager 2450 to configure distributed firewall rules. In some embodiments, the interface 2430 uses a set of representational state transfer (REST or RESTful) APIs with firewall configuration manager 2450 to perform DFW rules configuration and security group management. Firewall configuration manager 2450 in some embodiments is a component of the network virtualization manager (if a network virtualization manager is deployed in the datacenter).

A. Analytics Engine

Analytics engine 2415 analyzes the flow data and syslog data, and makes recommendations of possible firewall rules for micro-segmentation. Syslog is a standard for message logging. The logs are collected from different entities such as hosts, and datacenter services such as a distributed firewall.

A flow record or a syslog packet log entry defines a simple traffic pattern. It is defined as a tuple of multiple attributes, typically like <source ip, source port, destination ip, destination port, protocol, vlan id, byte count>. A micro-segmentation firewall rule in some embodiments defines a traffic pattern that is allowed between nodes, given a default deny policy. The analytics engine consumes the flow data and syslog data, and computes a set of firewall rules to match the traffic pattern of the data.

Often, the traffic pattern defined by a firewall rule includes a group of possible flow records. For example, a firewall rule like "tcp from 192.168.1.1 to 10.0.0.1:80 accept" can match any TCP connections from 192.168.1.1:1 to 10.0.0.1 port 80 because the rule omits the source port attribute in the flow records.

There is a tradeoff between the granularity of firewall rule attributes and the number of rules. Typically, the more attributes are omitted by a rule or the range of legitimate values of a rule attribute is greater, the more flow records the rule can match and therefore the fewer firewall rules are needed. However, such rules may have unintended consequences. Assuming firewall rules are defined as whitelist with a default deny policy, rules that match a large set of flows can allow illegitimate flows to pass through.

The analytics engine in some embodiments aggregates flow records in multiple stages based on the following set of criteria and makes recommendations of firewall rules accordingly. In a first stage, the analytics engine aggregates the raw flow records into 4-tuple <source ip, destination ip, destination port, and protocol. The analytics engine then performs further aggregation in several more stages based on destination ip, source ip, or both in the flow records. Some embodiments build a hash table in each stage where the hash key is based on the attributes that are aggregated. A cache of the top N records (where N is either a predefined or a configurable value) is maintained at each stage to be returned by query.

The following describes the operations performed by the analytics engine in further details. In a first stage, the analytics engine aggregates flow records based on server and service. All flow records that have the same protocol, destination ip, and destination port are aggregated into a new single flow record, and the byte count from those flow records are summed up into a new record. The new flow record thus is a tuple like <source ip, destination ip+destination port+protocol, byte count, flow count>. The new flow records are sorted based on byte count and flow count, and recommendation of the top N (e.g., N=5) flow records is made. The hash table in this stage is built using a hash of (source ip+destination ip+destination port+protocol).

The analytics engine groups flow records in stage 1 based on a set of servers in the same subnet. In stage 2, all flow records from stage 1 that have the same protocol, destination port, and subnet of destination ip are aggregated into a new single flow record. The byte count and flow count from these flow records are summed up into a new record. The new flow record thus is a tuple like <source ip, destination port+protocol+destination ip/subnet, byte count, flow count>. The new flow records are sorted based on byte count and flow count, and recommendation of the top N flow records are made. An example of a subnet is 24. Some embodiments pick a special subnet 0 to group all servers together. The hash table in this stage is built using a hash of (source ip+destination port+protocol+destination ip/subnet).

Stage 3 is similar to stage 2 with the difference that flow records in stage 1 are grouped based on a set of servers in the same VLAN. Thus the new flow record is a tuple like <source ip, destination port+protocol+vlan id, byte count, flow count>. The hash table in this stage is built using a hash of (source ip+destination port+protocol+vlan id).

Stage 4 aggregates flow records of stage 2 based on a set of clients in the same subnet. All flow records from stage 2 that have the same subnet of source ip are aggregated into a new single flow record. The byte count and flow count from these flow records are summed up into a new record. The new flow record thus is a tuple like <source ip/subnet+destination port+protocol+destination ip/subnet, byte count, flow count>. The new flow records are sorted based on byte count and flow count. Recommendation of the top N flow records are made. The hash table in this stage is built using a hash of (source ip/subnet+destination port+protocol+destination ip/subnet).

Stage 5 is similar to stage 4 with the difference that flow records in stage 2 are aggregated based on a set of clients in the same VLAN. Thus the new flow record is a tuple like <vlan id+destination port+protocol+destination ip/subnet, byte count, flow count>. The hash table in this stage is built using a hash of (vlan id+destination port+protocol+destination ip/subnet).

Stage 6 is similar to stage 2 with the difference that servers in the same compute manager container are grouped together. The new flow record is a tuple like <source ip, destination port+protocol+compute manager container, byte count, flow count>. The hash table in this stage is built using a hash of (source ip+destination port+protocol+compute manager container).

Stage 7 is similar to stage 4 with the difference that clients in the same compute manager container are grouped together. The new flow record is a tuple like <compute manager container+destination port+protocol+destination ip/subnet, byte count, flow count>. The hash table in this stage is built using a hash of (VC container+destination port+protocol+destination ip/subnet).

Stage 8 is similar to 4 with the difference that clients and servers in the same compute manager containers are grouped together. The new flow record thus is a tuple like <compute manager container+destination port+protocol+compute manager container, byte count, flow count>. The hash table in this stage is built using a hash of (compute manager container+destination port+protocol+compute manager container).

The GUI runs queries to the analytics engine and the engine returns suggested rules. The input data of analytics engine is a database of flow records such as <source ip, source port, destination ip, destination port, protocol, vlan id, byte count>. The query input in some embodiments includes identifier of the stage and the maximum number of firewall rules to return. The query output includes a list of recommended tuples of firewall rules.

B. The Graphical User Interface

Figure 25:
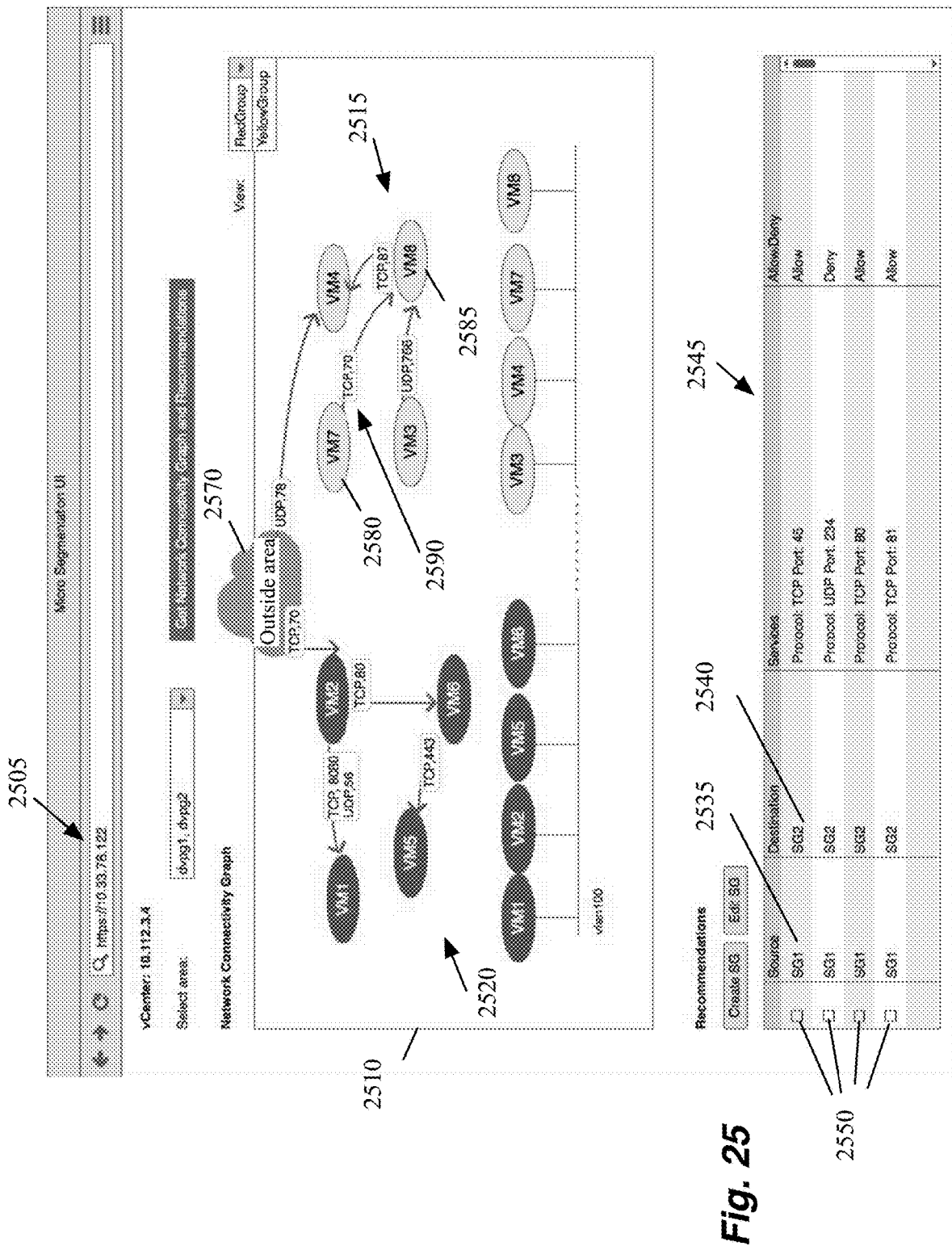
FIG. 25 illustrates an example of a GUI provided in some embodiments.

FIG. 25 illustrates an example of a GUI provided in some embodiments. In this figure, the user has selected a network 2505 and requested to view the network connectivity graph 2510 for the selected network. The user can select multiple networks and view the connectivity graphs for all selected networks.

The figure shows the VMs in the network are grouped into two separate groups 2515 and 2520. The connectivity graph shows how the VMs in each group communicate with each other and with the outside of the group 2570. The connectivity graph also shows the protocol and ports used for communication. For instance VM7 2580 is shown to communicate with VM8 2585 using TCP on port 70 (as shown by 2590).

As described above by reference to FIG. 24, the GUI queries inventory from the compute manager and the flow data from analytics engine to provide the visual topology (as shown by the network connectivity graph 2510) to the user for making rule recommendations and creating security groups. The analytics engine in some embodiments provides a collection of nodes and edges (as shown by the VM1-VM8, the outside area 2570, and the connections between them) to the GUI in order to plot the network connectivity graph.

The GUI allows the user to create security groups and rules based on the connectivity graph. In this example, the user has generated two security groups 2535 and 2540. In some embodiments, the analytics engine provides recommendations for generating security groups. The figure also shows that a set of recommendations 2545 for firewall rules are made (e.g., by the analytics engine 2415 in FIG. 24). The user can select (by using the selection buttons 2550) any of the recommended rules. The user can also use the GUI to edit, add, or delete firewall rules. The firewall rules in some embodiments are machine driven and presented to the user for approval. The GUI in some embodiments also provides the user with tools to create firewall rules or modify the machine driven rules.

Figure 26:
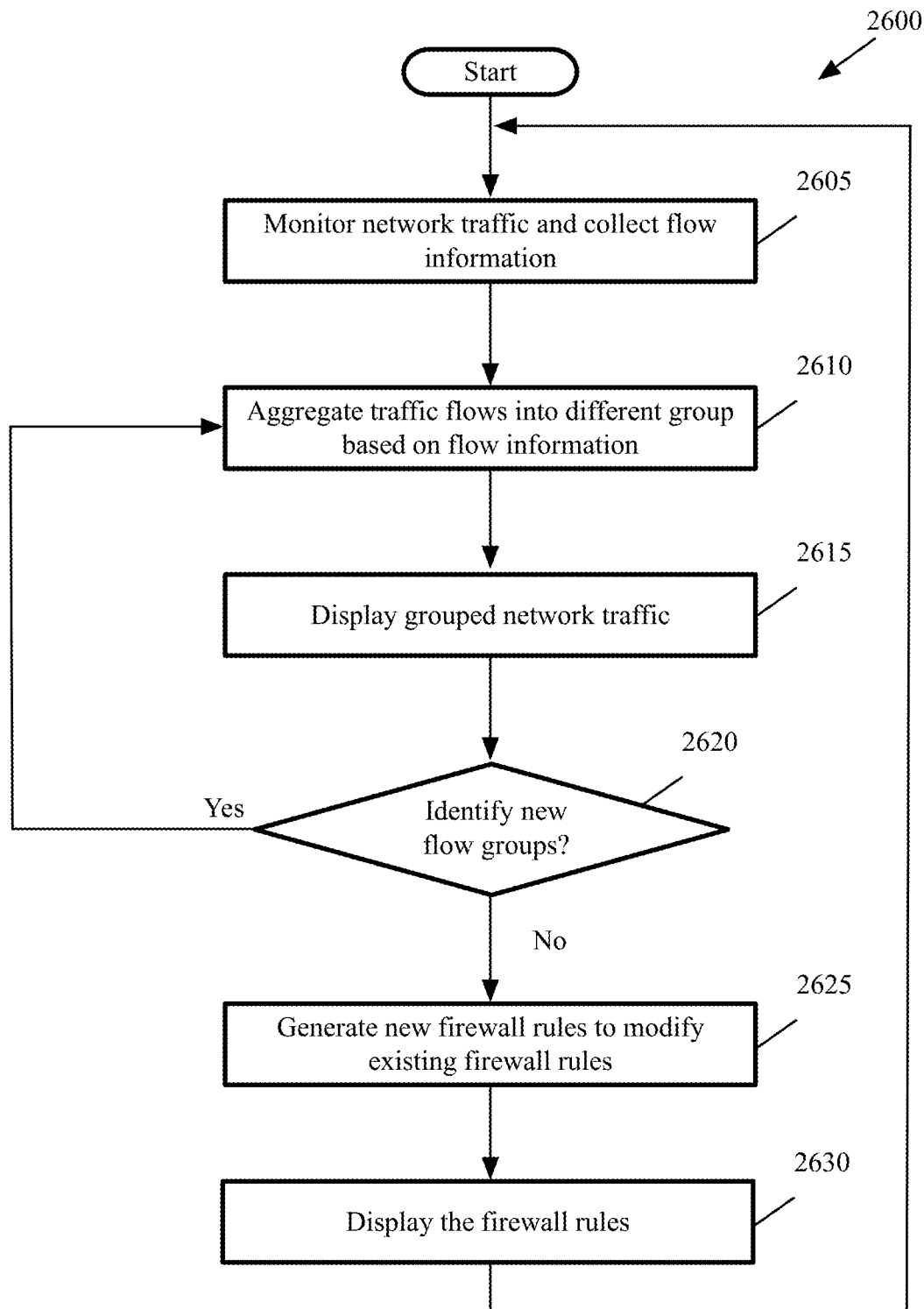
FIG. 26 conceptually illustrates a process for visualizing packet flows in a network in some embodiments. As FIG. 27 conceptually illustrates a process for creating micro-segmentation policies based on generated application templates in some embodiments.

FIG. 26 conceptually illustrates a process 2600 for visualizing packet flows in a network in some embodiments. The process in some embodiments is performed by a tool such as tool 2400 in FIG. 24. As shown, the process monitors (at 2605) network packet traffic and collects information about network packet flows. The process then aggregates (at 2610) the traffic flows into different groups. As described above, the analytics engine uses different criteria in different stages to aggregate the flows.

The process then displays (at 2615) the network topology as a connectivity graph using the aggregated flow records. For instance, the process displays a network connectivity graph such as network connectivity graph 2510 in FIG. 25 for one or more networks selected by the user. The process then determines (at 2620) whether flows can be aggregated into new groups. In some embodiments, the process monitors the network traffic and modifies a displayed network connectivity graph in real time to enable the user to visualize any changes in the network topology in real time.

If yes, the process proceeds to 2610, which was described above. Otherwise, the process generates (at 2625) new firewall rules or modifies existing firewall rules. For instance, the process generates firewall rules 2545 as shown in FIG. 25. The firewall rules can be machine driven and presented to the user for approval. the process then displays (at 2630) the firewall rules. For instance, the process displays firewall rules 2545 shown in FIG. 25. The process also provides the user with tools to create firewall rules or modify the machine driven rules. The process then proceeds to 2605 to continue monitoring network traffic in real time.

III. Creating and Using Application Templates for Providing Micro-Segmentation Policies Some embodiments provide a method that utilizes deep packet inspection (DPI) and application templates to create micro-segmentation policy for network applications. Traditional approaches to securing datacenters focused on having perimeter oriented controls like firewalls, intrusion prevention systems etc., deployed at the perimeter of the datacenter. In the perimeter based security model, security administrators needed to know only the ports that are be opened for the application accessed. Most often this is the web server to which port 80 (i.e., HTTP service port) traffic has to be permitted in the firewalls.

With the introduction of micro-segmentation, all communications inside the datacenter including intra-application communications can be controlled. Properly deployed micro-segmentation based datacenters have significantly better security compared to perimeter only security deployments. Although micro-segmentation as a technology enables firewall administrators to build very granular access control rules for intra-application components, it is a challenge for the firewall administrators to understand the different communication flows that need to be enabled between these components to make sure that the applications work as expected.

Enterprise datacenters host multiple types of network applications including well known vendor applications (e.g., Microsoft® Sharepoint®, Microsoft® Exchange, VMWare® Horizon™, Citrix® XenDesktop®, etc.), private cloud applications based on blueprints (which are used to describe a desired set of inter-related cloud resource), custom applications that are unique to each deployment, etc. Some embodiments provide a method that enables firewall administration teams to quickly deploy micro-segmentation oriented policies for well known vendor applications for both brownfield (applications that are already deployed) as well as greenfield (applications that are about to be deployed) scenarios.

Figure 27:
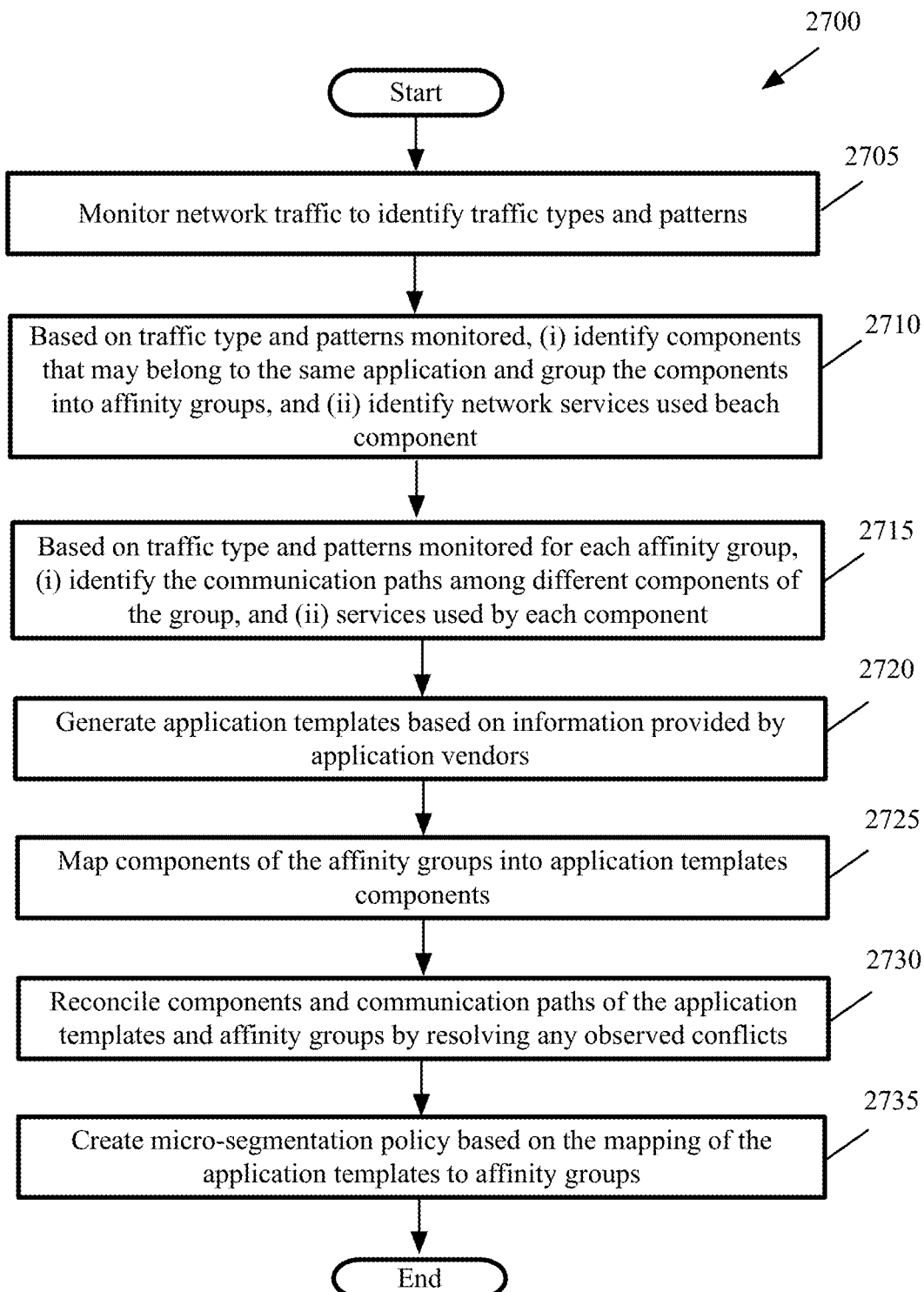

FIG. 27 conceptually illustrates a process 2700 for creating micro-segmentation policies based on generated application templates in some embodiments. The process in some embodiments is performed by the network virtualization manager such as network virtualization manager 110 in FIG. 1. In other embodiments, the process performed by a tool such as tool 2400 in FIG. 24.

As shown, the process monitors (at 2705) the network traffic to identify unique traffic type and patterns. Some embodiments utilize DPI to inspect packets. For instance, using DPI may identify the presence of PC over IP (PCoIP) traffic. PCoIP traffic can be used to identify VMware® Horizon View™ as one of the deployed applications.

Some embodiments utilize DPI enriched network traffic analysis to find application components and relationships.

For instance, some embodiments utilize a network protocol such as NetFlow that allows collection and monitoring of network traffic flow. The placement application templates for well known applications are identified based on certain types of traffic flow to help mapping traffic to the deployed applications and creating micro-segmentation policy. In a brownfield deployment, applications are already deployed and running. First order of business for administrators in such a scenario is to reconstruct the list of applications running in the datacenter and classify them into component affinity groups.

Figure 28:
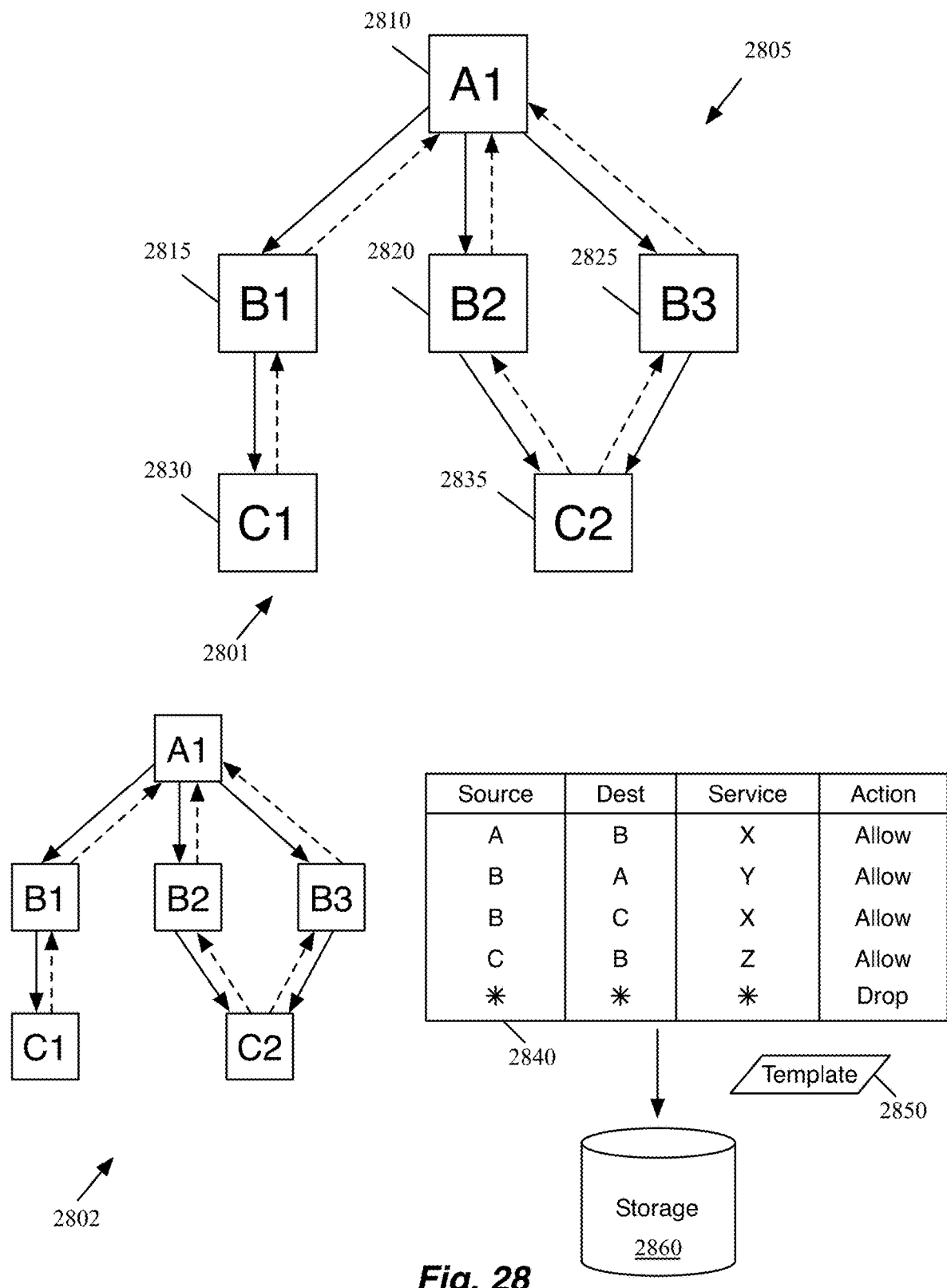
FIG. 28 conceptually illustrates identifying application affinity groups and determining application templates in some embodiments.

Based on the analysis of the traffic types and patterns monitored, process 2700 identifies (at 2710) components that may belong to the same application and groups these components into affinity groups. The process also identifies (at 2710) the services used by each components. FIG. 28 conceptually illustrates identifying application affinity groups and determining application templates in some embodiments. The figure is shown in two stages 2801 and 2802. The example of FIG. 28 shows a three-tiered application 2805 that includes a web server VM 2810, several application server VMs 2815, and several database server VMs 2820.

Some embodiments utilize a network protocol such as NetFlow to analyze network flow traffic and group different components into component affinity groups. For instance, in stage 2801 in FIG. 28, components 2810-2835 are identified as components of the same affinity group. The affinity groups identify the components that have higher affinity with each other. However, having higher affinity may or may not mean that those components really belong to the same application. For instance, an application component accessing a domain name server (DNS) does not mean that the DNS server belong to the application. For this reason, some embodiments separates out "common network services" from "application traffic". Some embodiments use DPI based traffic monitoring to identify key patterns that can help point the applications running. For instance, the existence of PCoIP traffic is an indication that VMware® Horizon™ application is deployed in the datacenter.

Based on the analysis of the traffic types and patterns monitored, process 2700 also identifies (at 2715) the communication paths among different components of each affinity group as well as the services used by each component. At the end of this analysis phase, the list of affinity groups for common network services is determined and elements in each affinity group list are identified. Also, the observed communication paths among different components (e.g., as shown by the arrows between components 2810-2820 in FIG. 28), and observed access to common services from different components are identified.

During the analysis phase, however, the information is not sufficient for the administrators to create micro-segmentation policy. This is due to the fact that there may be some communications among components that did not happen during the observation period in the analysis phase (e.g., reporting or batch services that run infrequently or administration traffic such as command line interface (CLI) or secure shell (SSH)). There also may be unintended traffic observed due to malicious activity. Creating a policy to allow all observed communications could result in an open security hole in the system for malicious actors to exploit.

Process 2700 then generates (at 2720) application templates based on information provided by application vendors. Majority of the vendors that sell software for enterprise datacenters provide the deployment architectural guidance including the list of components and the communication flows among different components. Some embodiments built application templates based on information available for individual applications. The information include application name and vendor, application version match criteria, application identification criteria (e.g., protocol is PCoIP), and list of application components. For each component, the information may include whether the component is mandatory or optional, cardinality of the component, typical deployment location (e.g., client, demilitarized zone (DMZ), internal, etc.), communication paths to be opened, source component, source port, destination component, and destination port.

Process 2700 then maps (at 2725) the components of the affinity groups into application templates components. In brownfield scenarios application templates alone are not sufficient for creating micro-segmentation policy as administrators need to map the template to the deployed application components. The process provides application template mapping to affinity groups.

The process then reconciles (at 2730) components and communication paths of application templates and affinity groups by resolving any observed conflicts. In some embodiments, the process provides auto-mapping of affinity group components into the application template components wherever auto-mapping can be done without conflicts. When conflicts are observed between the two models, manual workflows are triggered to let administrators resolve the conflicts.

Conflict scenarios include mandatory components that are defined in the template are not observed in traffic flows and spurious communications are observed that violate template definitions. The process then creates (at 2735) micro-segmentation policies (e.g., distributed firewall rules) based on the mapping of the application templates to affinity groups. The process then ends.

Once the affinity groups are identified and component and communication paths from application templates are reconciled, micro-segmentation policies are created. Based on the pattern match found by DPI, the application template is generated and is used for policy creation. Customization of micro-segmentation policy is allowed based on the template to match the brownfield deployment in some embodiments. Supporting greenfield scenario is a subset of brownfield scenario and requires policy creation based on the application template.

As shown in stage 2802 in FIG. 28, an application template 2850 is specified and micro-segmentation policies 2840 are created for the application 2805. In case of greenfield deployment of an application, application affinity group analysis and mapping with application templates is not needed and a simpler workflow purely based on application templates is used. The solution for brownfield projects is divided into the following steps in some embodiments. Based upon the analysis performed by a network traffic analyzer, a graph is created (e.g., the graph created in FIG. 28 for application 2805) and the edges and nodes of the graph are defined. The traffic between the nodes of the graph are identified (e.g., as shown by the arrows between nodes 2810-2820 in FIG. 28) based on the DPI.

The identical traffic between nodes are grouped in order to group the nodes into a set such as a security group. Based on the applications detected and the security groups, known templates related to the applications and nodes are identified and matched. Unknown applications and traffic between nodes (either individual nodes or nodes in a security group) are grouped into buckets for further analysis and approval and possible template creation. Templates in some embodiments are automatically created for these traffic patterns and displayed for approval. Members of security groups are horizontally segmented based upon their placement (e.g., as logical networks, switches, VLAN identifier (VNI), etc.). The templates are presented and marked based upon these attributes.

Figure 29:
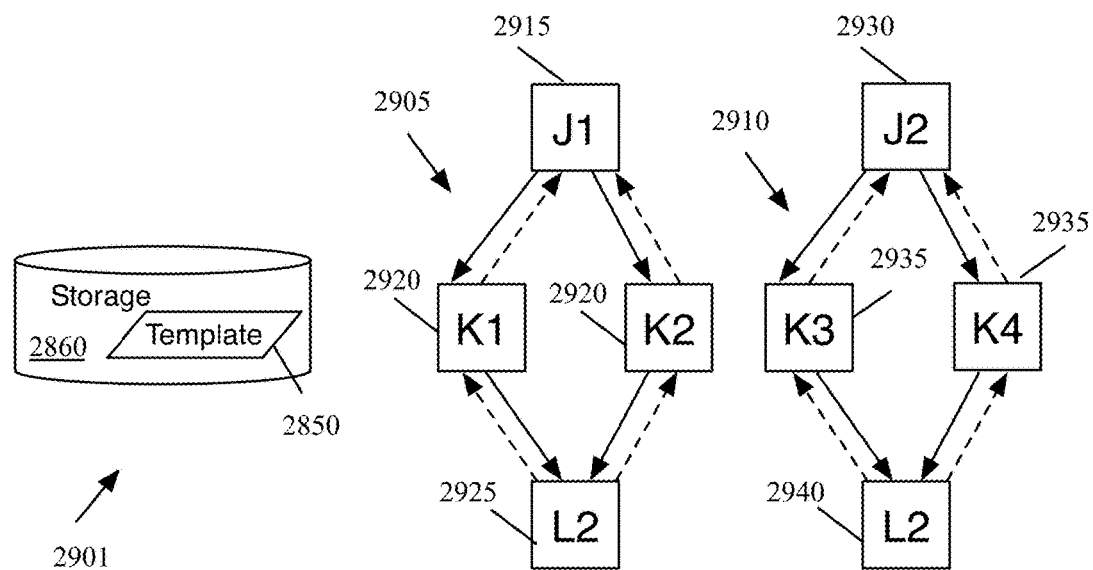
FIG. 29 conceptually illustrates identifying application affinity groups with similar flow characteristics as the application affinity group in FIG. 28 and applying the same micro-segmentation policies to the identified affinity group.
Figure 29:
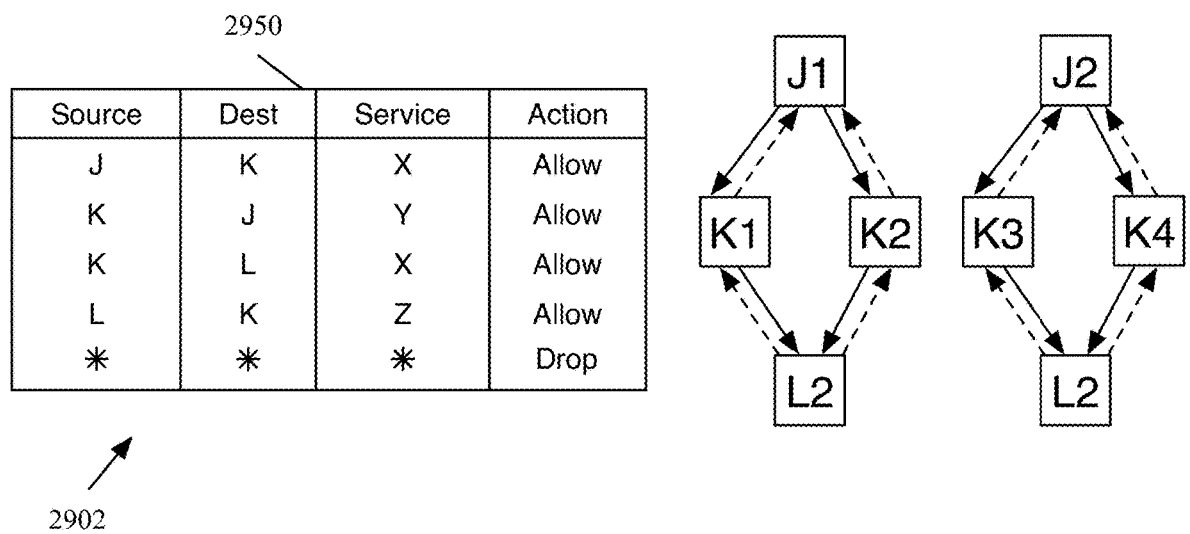

As shown in stage 2802 in FIG. 28, the template 2850 and the micro-segmentation policy 2840 are saved in a storage 2860. The template can used to identify applications with similar characteristics in order to propose similar micro-segmentation polices. FIG. 29 conceptually illustrates identifying application affinity groups with similar flow characteristics as the application affinity group in FIG. 28 and applying the same micro-segmentation policies to the identified affinity group.

The figure is shown in two stages 2901 and 2902. In stage 2901 several applications 2905-2910 are identified that communicate the same type of flows (as conceptually shown by the arrows between the nodes 2915-2925 and 2930-2940). In this example, the template identified for application 2905-2910 are similar to the template 2850 for application 2805 in FIG. 28. As shown, a micro-segmentation policy 2950 similar to the micro-segmentation policy 2840 is created to apply to applications 2905-2910.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 30:
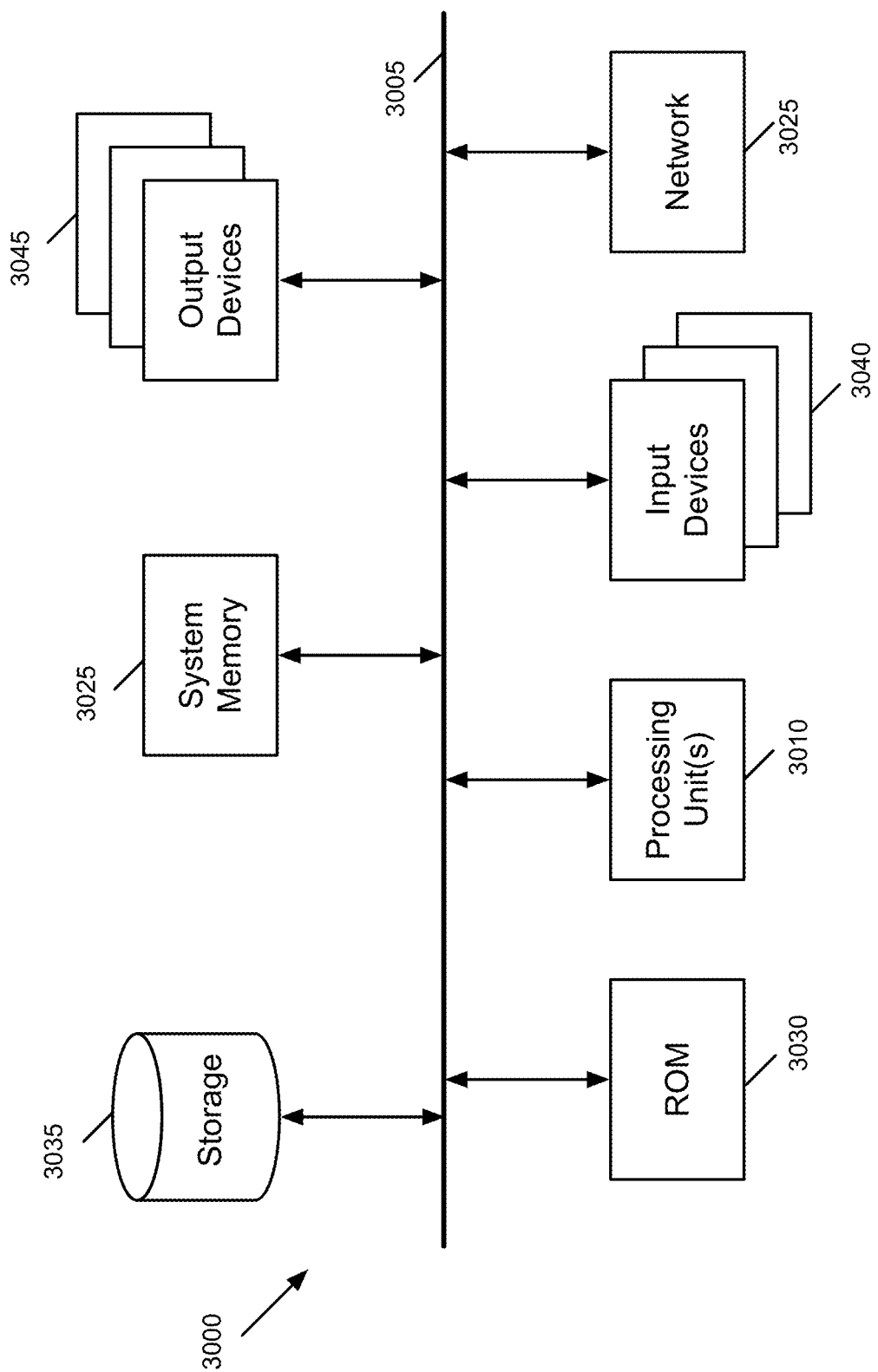
FIG. 30 conceptually illustrates an electronic system with which some embodiments of the invention are implemented.

FIG. 30 conceptually illustrates an electronic system 3000 with which some embodiments of the invention are implemented. The electronic system 3000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 3000 includes a bus 3005, processing unit(s) 3010, a system memory 3025, a read-only memory 3030, a permanent storage device 3035, input devices 3040, and output devices 3045.

The bus 3005 collectively represents all system, peripheral, and chipset buses that communicatively connect the numerous internal devices of the electronic system 3000. For instance, the bus 3005 communicatively connects the processing unit(s) 3010 with the read-only memory 3030, the system memory 3025, and the permanent storage device 3035.

From these various memory units, the processing unit(s) 3010 retrieves instructions to execute and data to process in order to execute the processes of the invention. The processing unit(s) may be a single processor or a multi-core processor in different embodiments.

The read-only-memory (ROM) 3030 stores static data and instructions that are needed by the processing unit(s) 3010 and other modules of the electronic system. The permanent storage device 3035, on the other hand, is a read-and-write memory device. This device is a non-volatile memory unit that stores instructions and data even when the electronic system 3000 is off. Some embodiments of the invention use a mass-storage device (such as a magnetic or optical disk and its corresponding disk drive) as the permanent storage device 3035.

Other embodiments use a removable storage device (such as a floppy disk, flash memory device, etc., and its corresponding drive) as the permanent storage device. Like the permanent storage device 3035, the system memory 3025 is a read-and-write memory device. However, unlike storage device 3035, the system memory 3025 is a volatile read-and-write memory, such a random access memory. The system memory 3025 stores some of the instructions and data that the processor needs at runtime. In some embodiments, the invention's processes are stored in the system memory 3025, the permanent storage device 3035, and/or the read-only memory 3030. From these various memory units, the processing unit(s) 3010 retrieves instructions to execute and data to process in order to execute the processes of some embodiments.

The bus 3005 also connects to the input and output devices 3040 and 3045. The input devices 3040 enable the user to communicate information and select commands to the electronic system. The input devices 3040 include alphanumeric keyboards and pointing devices (also called "cursor control devices"), cameras (e.g., webcams), microphones or similar devices for receiving voice commands, etc. The output devices 3045 display images generated by the electronic system or otherwise output data. The output devices 3045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 30, bus 3005 also couples electronic system 3000 to a network 3065 through a network adapter (not shown). In this manner, the computer can be a part of a network of computers (such as a local area network ("LAN"), a wide area network ("WAN"), or an Intranet, or a network of networks, such as the Internet. Any or all components of electronic system 3000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for visualizing network flows between a plurality of machines that execute distributed applications in a network, the method comprising:
   monitoring network flows between the plurality of machines to collect network flow information, wherein each network flow is represented in the collected network flow information as a data tuple comprising values for a plurality of fields;
   presenting, in a graphical user interface, the collected network flow information in order for a user to review and to select a subset of presented network flows for further analysis;
   based on the user's selection of the subset of the presented network flows, aggregating the selected subset of network flows into a plurality of different groups of flows; and
   for each particular group of flows of the plurality of groups:
      generating a set of one or more recommended security rules to apply to the particular group of flows, the set of recommended security rules for the particular group of flows matching on a set of values representing the network flows of the particular group of flows; and
      displaying, in a user interface, an aggregated set of flow records for the particular group of flows along with the set of recommended security rules for a user to select for application to the particular group of flows.

2. The method of claim 1, wherein the aggregated set of flow records for each particular group of flows identifies at least one of (i) a number of packets in the particular group of network flows and (ii) an amount of data in the particular group of network flows.

3. The method of claim 1, wherein the set of values comprises at least one of source Internet protocol (IP) address, source port, destination IP address, destination port, and protocol fields.

4. The method of claim 1 further comprising retrieving a mapping of the set of values to names from a network inventory comprising logical network information for the plurality of machines in the network, wherein the aggregated sets of flow records are displayed using the names from the network inventory.

5. The method of claim 4, wherein the names comprise at least one of virtual network interface controller (VNIC) identifiers, machine names for source and destination machines associated with the network flows, and one or more logical networks associated with the network flows.

6. The method of claim 4, wherein the names comprise at least one of tenant identifiers for different tenants with machines in the plurality of machines, tier identifiers of a multi-tier application, and application identifiers.

7. The method of claim 1 further comprising:
   displaying a plurality of flow records;
   receiving input to select a subset of the displayed plurality of flow records; and
   creating a new flow record that aggregates the selected subset of flow records.

8. The method of claim 1, wherein the displayed sets of aggregated flow records are displayed at a first level of detail, wherein the method further comprises:
   receiving input to display the aggregated flow records at a second level of detail; and
   displaying the aggregated flow records at the second level of detail.

9. The method of claim 8, wherein the second level of detail separates the aggregated sets of flow records into a greater number of flow records.

10. A non-transitory computer readable medium storing a program for visualizing network flows between a plurality of machines that execute distributed applications in a network, the program executable by a processing unit, the program comprising sets of instructions for:
   monitoring network flows between the plurality of machines to collect network flow information, wherein each network flow is represented in the collected network flow information as a data tuple comprising values for a plurality of fields;
   presenting, in a graphical user interface, the collected network flow information in order for a user to review and to select a subset of presented network flows for further analysis;
   based on the user's selection of the subset of the presented network flows, aggregating the selected subset of network flows into a plurality of different groups of flows; and
   for each particular group of flows of the plurality of groups:
      generating a set of one or more recommended security rules to apply to the particular group of flows, the set of recommended security rules for the particular group of flows matching on a set of values representing the network flows of the particular group of flows; and
      displaying, in a user interface, an aggregated set of flow records for the particular group of flows along with the set of recommended security rules for a user to select for application to the particular group of flows.

11. The non-transitory computer readable medium of claim 10, wherein the aggregated set of flow records for each particular group of flows identifies at least one of (i) a number of packets in the particular group of network flows and (ii) an amount of data in the particular group of network flows.

12. The non-transitory computer readable medium of claim 10, wherein the set of values comprises at least one of source Internet protocol (IP) address, source port, destination IP address, destination port, and protocol fields.

13. The non-transitory computer readable medium of claim 10, wherein the program further comprises a set of instructions for retrieving a mapping of the set of values to names from a network inventory comprising logical network information for the plurality of machines in the network, wherein the aggregated sets of flow records are displayed using the names from the network inventory.

14. The non-transitory computer readable medium of claim 10, wherein the generated sets of recommended security rules comprise sets of firewall rules.

15. The non-transitory computer readable medium of claim 10, wherein the program further comprises sets of instructions for:
   receiving input to identify a particular recommended security rule; and
   applying the particular recommended security rule at a set of points in the network.

16. The non-transitory computer readable medium of claim 10, wherein the plurality of groups into which the network flows are aggregated comprises a single group for all unknown traffic.

17. The non-transitory computer readable medium of claim 10, wherein using the sets of values to aggregate the monitored network flows comprises assigning a set of control flows and a set of data flows associated with a particular application to a same group, wherein the control flows communicate over a first set of ports and the data flows communicate over a different second set of ports.

18. The method of claim 1, wherein using the sets of values to aggregate the monitored network flows into the plurality of different groups of flows comprises:
   identifying network flows that have the same set of values from the sets of values in the data tuples representing the network flows for the particular selected set of fields; and
   aggregating the identified network flows with the same sets of values into the groups of flows.

* * * * *